US008938454B2

(12) United States Patent
Chao et al.

(10) Patent No.: US 8,938,454 B2
(45) Date of Patent: Jan. 20, 2015

(54) USING A TUNABLE FINITE AUTOMATON FOR REGULAR EXPRESSION MATCHING

(71) Applicants: H. Jonathan Chao, Holmdel, NJ (US); Yang Xu, Brooklyn, NY (US)

(72) Inventors: H. Jonathan Chao, Holmdel, NJ (US); Yang Xu, Brooklyn, NY (US)

(73) Assignee: Polytechnic Institute of New York University, Brooklyn, NY (US)

( * ) Notice: Subject to any disclaimer, the term of this patent is extended or adjusted under 35 U.S.C. 154(b) by 134 days.

(21) Appl. No.: 13/648,438

(22) Filed: Oct. 10, 2012

(65) Prior Publication Data

US 2014/0101187 A1    Apr. 10, 2014

(51) Int. Cl.
 G06F 7/00      (2006.01)
 G06F 17/30    (2006.01)

(52) U.S. Cl.
 USPC .......................................... 707/737; 707/803

(58) Field of Classification Search
 None
 See application file for complete search history.

(56) References Cited

U.S. PATENT DOCUMENTS

| 2008/0109431 | A1* | 5/2008 | Kori ................................. 707/6 |
| 2009/0106183 | A1* | 4/2009 | Estan et al. ..................... 706/48 |
| 2010/0131935 | A1* | 5/2010 | Wang ............................. 717/143 |
| 2011/0320397 | A1* | 12/2011 | Podkolzin et al. .............. 706/48 |
| 2014/0101155 | A1 | 4/2014 | Chao |
| 2014/0101156 | A1 | 4/2014 | Chao |
| 2014/0101157 | A1 | 4/2014 | Chao |

FOREIGN PATENT DOCUMENTS

WO    WO 2009116646 A1 *  9/2009

OTHER PUBLICATIONS

Glenn Ammons et al, "Mining Specifications", ACM 2002, 13 pages.*

* cited by examiner

*Primary Examiner* — Uyen Le
(74) *Attorney, Agent, or Firm* — John C. Pokotylo; Straub & Pokotylo

(57) ABSTRACT

Deterministic Finite Automatons (DFAs) and Nondeterministic Finite Automatons (NFAs) are two typical automatons used in the Network Intrusion Detection System (NIDS). Although they both perform regular expression matching, they have quite different performance and memory usage properties. DFAs provide fast and deterministic matching performance but suffer from the well-known state explosion problem. NFAs are compact, but their matching performance is unpredictable and with no worst case guarantee. A new automaton representation of regular expressions, called Tunable Finite Automaton (TFA), is described. TFAs resolve the DFAs' state explosion problem and the NFAs' unpredictable performance problem. Different from a DFA, which has only one active state, a TFA allows multiple concurrent active states. Thus, the total number of states required by the TFA to track the matching status is much smaller than that required by the DFA. Different from an NFA, a TFA guarantees that the number of concurrent active states is bounded by a bound factor b that can be tuned during the construction of the TFA according to the needs of the application for speed and storage. A TFA can achieve significant reductions in the number of states and memory space.

12 Claims, 25 Drawing Sheets

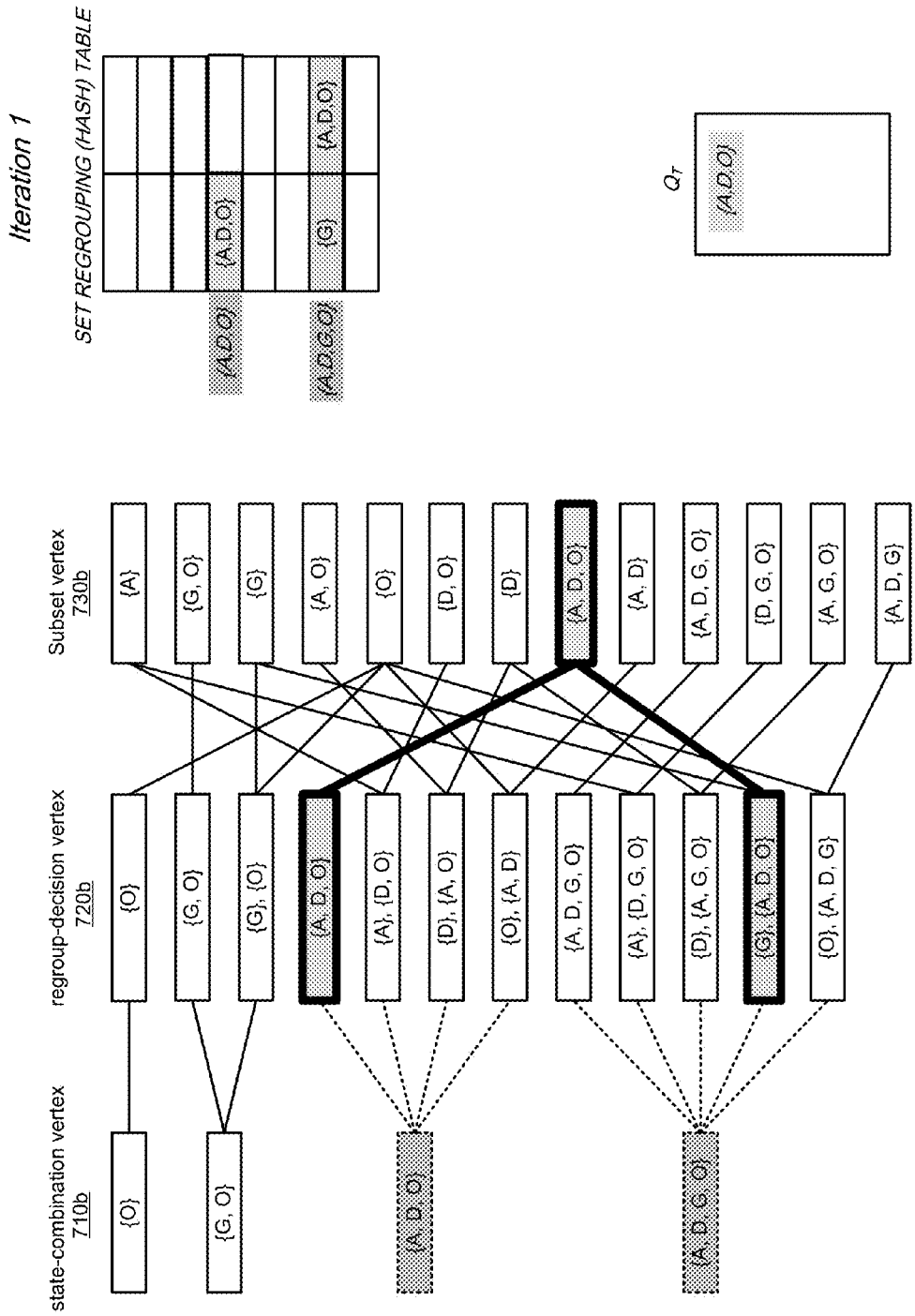

USING A TUNABLE FINITE AUTOMATON FOR REGULAR EXPRESSION MATCHING

§1. BACKGROUND OF THE INVENTION

§1.1 Field of the Invention

The present invention concerns pattern matching using regular expression matching. More specifically, the present invention concerns generating and using a finite automaton for regular expression matching.

§1.2 Background Information

Embodiments consistent with the present invention may be used in various applications which require regular expression matching. Such applications may include, for example, file search by an operating system or software application, syntax checking by compilers, and network security. The network security applications are instructed in detail below.

§1.2.1 Deep Packet Inspection for Network Security

Deep Packet Inspection ("DPI") is a crucial technique used in today's Network Intrusion Detection System ("NIDS"). DPI is used to compare incoming packets, byte-by-byte, against patterns stored in a database to identify specific viruses, attacks, and/or protocols. Early DPI methods relied on exact string matching for attack detection. (See, e.g., the references: S. Wu and U. Manber, "A Fast Algorithm for Multi-Pattern Searching," Dept. of Computer Science, University of Arizona, Tech. Rep. (1994) (incorporated herein by reference); A. V. Aho and M. J. Corasick, "Efficient String Matching: An Aid to Bibliographic Search," Commun. of the ACM, Vol. 18, No. 6, pp. 333-340 (1975) (incorporated herein by reference); S. Dharmapurikar and J. W. Lockwood, "Fast and Scalable Pattern Matching for Network Intrusion Detection Systems," IEEE J SEL AREA COMM, Vol. 24, No. 10, pp. 1781-1792 (2006) (incorporated herein by reference); and N. Tuck, T. Sherwood, B. Calder, and G. Varghese, "Deterministic Memory-Efficient String Matching Algorithms for Intrusion Detection," Proc. of IEEE INFOCOM (2004) (incorporated herein by reference).) On the other hand, recent DPI methods use regular expression matching (See, e.g., the references: F. Yu, Z. Chen, Y. Diao, T. V. Lakshman, and R. H. Katz, "Fast and Memory-Efficient Regular Expression Matching for Deep Packet Inspection," Proc. of ACM/IEEE ANCS (2006) (incorporated herein by reference); S. Kumar, S. Dharmapurikar, F. Yu, P. Crowley, and J. Turner, "Algorithms to Accelerate Multiple Regular Expressions Matching for Deep Packet Inspection," Proc. of ACM SIGCOMM (2007) (incorporated herein by reference); R. Smith, C. Estan, and S. Jha, "XFA: Faster Signature Matching with Extended Automata," IEEE Symposium on Security and Privacy (2008) (incorporated herein by reference); and M. Becchi and P. Crowley, "A Hybrid Finite Automaton for Practical Deep Packet Inspection," Proc. of ACM CoNEXT (2007) (incorporated herein by reference).) because it provides better flexibility in the representation of ever evolving attacks. (See, e.g., the reference, R. Sommer and V. Paxson, "Enhancing Byte-Level Network Intrusion Detection Signatures with Context," Proc. of the ACM Conference on Computer and Communications Security (CCS) (2003) (incorporated herein by reference).) Indeed, regular expression matching has been widely used in many NIDSes such as Snort (See, e.g., "A Free Lightweight Network Intrusion Detection System for UNIX and Windows," available online at http://www.snort.org (incorporated herein by reference).), Bro (See, e.g., Bro Intrusion Detection System, available online at http://www.broids.org) (incorporated herein by reference).); and several network security appliances from Cisco systems (See, e.g., "Cisco IPS Deployment Guide," available online at http://www.cisco.com (incorporated herein by reference).). It has become the de facto standard for content inspection.

§1.2.2 Using Deterministic Finite Automatons ("DFAS") and Nondeterministic Finite Automatons ("NFAS") to Represent Regular Expressions Despite its ability to represent attacks with flexibility, regular expression matching introduces significant computational and storage challenges. Deterministic Finite Automatons ("DFAs") and Nondeterministic Finite Automatons ("NFAs") are two typical representations of regular expressions. Given a set of regular expressions, one can easily construct the corresponding NFA. The DFA can be further constructed from the NFA using a subset construction scheme. (See, e.g., the reference, J. E. Hoperoft, R. Motwani, and J. D. Ullman, Introduction to Automata Theory, Languages, and Computation—International Edition, (2nd Ed) (Addison-Wesley, 2003) (incorporated herein by reference).)

DFAs and NFAs have quite different performance and memory usage characteristics. A DFA has at most one active state during the entire matching process. Therefore, a DFA requires only one state traversal for each character processing. This results in a deterministic memory bandwidth requirement. The main problem of using a DFA to represent regular expressions is the DFA's severe state explosion problem (See, e.g., F. Yu, Z. Chen, Y. Diao, T. V. Lakshman, and R. H. Katz, "Fast and Memory-Efficient Regular Expression Matching for Deep Packet Inspection," Proc. of ACM/IEEE ANCS (2006) (incorporated herein by reference).), which often leads to a prohibitively large memory requirement. In contrast, an NFA represents regular expressions with much less memory storage. However, this memory reduction comes with the tradeoff of a high and unpredictable memory bandwidth requirement (because the number of concurrent active states in an NFA is unpredictable during the matching). Processing a single character in a packet with an NFA may induce a large number of state traversals. This causes a large number of memory accesses, which limits matching speed.

Recently, research proposed in literature pursues a tradeoff between the computational complexity and storage complexity for the regular expression matching (See, e.g., the references: F. Yu, Z. Chen, Y. Diao, T. V. Lakshman, and R. H. Katz, "Fast and Memory-Efficient Regular Expression Matching for Deep Packet Inspection," Proc. of ACM/IEEE ANCS (2006) (incorporated herein by reference); S. Kumar, S. Dharmapurikar, F. Yu, P. Crowley, and J. Turner, "Algorithms to Accelerate Multiple Regular Expressions Matching for Deep Packet Inspection," Proc. of ACM SIGCOMM (2007) (incorporated herein by reference); R. Smith, C. Estan, and S. Jha, "XFA: Faster Signature Matching with Extended Automata," IEEE Symposium on Security and Privacy (2008) (incorporated herein by reference); M. Becchi and P. Crowley, "A Hybrid Finite Automaton for Practical Deep Packet Inspection," Proc. of ACM CoNEXT (2007) (incorporated herein by reference); R. Sommer and V. Paxson, "Enhancing Byte-Level Network Intrusion Detection Signatures with Context," Proc. of the ACM Conference on Computer and Communications Security (CCS) (2003) (incorporated herein by reference); and S. Kumar, J. Turner, and J. Williams, "Advanced Algorithms for Fast and Scalable Deep Packet Inspection," Proc. of ACM/IEEE ANCS (2006) (incorporated herein by reference). Among these proposed solutions, some (See, e.g., the M. Becchi and P. Crowley reference and the R. Sommer and V. Paxson reference.), like the present invention, seek to design a hybrid finite automaton fitting between DFAs and NFAs. Unlike the present invention, however, these proposed automatons, though compact and fast when processing common traffic, suffer from poor performance in the worst cases. This is because none of them can guarantee an upper bound on the number of active states during the matching processing. This weakness can potentially be exploited by attackers to construct a worst-case traffic that can slow down the NIDS and cause malicious traffic to escape inspection. In fact, the design of a finite automaton with a small (larger than one) but bounded number of active states remains an open and challenging problem.

§1.2.3 Related Work in Regular Expression Matching

Most of the current research in regular expression matching focuses on reducing the memory usage of DFAs and can be classified into (1) transition reduction, (2) state reduction, or (3) hybrid finite automaton. Each of these memory usage reduction techniques is described below.

"Transition reduction" schemes reduce the memory usage of a DFA by eliminating redundant transitions. The D2FA (See, e.g., S. Kumar, S. Dharmapurikar, F. Yu, P. Crowley, and J. Turner, "Algorithms to Accelerate Multiple Regular Expressions Matching for Deep Packet Inspection," *Proc. of ACM SIGCOMM* (2007) (incorporated herein by reference).), proposed by Kumar et al. is a representative method in this category. It eliminates redundant transitions in a DFA by introducing default transitions, and saves memory usage. However, the memory access times for each input character increases. After the D2FA, many other schemes, such as the CD2FA (See, e.g., the references: S. Kumar, J. Turner, and J. Williams, "Advanced Algorithms for Fast and Scalable Deep Packet Inspection," *Proc. of ACM/IEEE ANCS* (2006) (incorporated herein by reference); and M. Becchi and P. Crowley, "An Improved Algorithm to Accelerate Regular Expression Evaluation," *Proc. of ACM/IEEE ANCS* (2007) (incorporated herein by reference).) were proposed to improve the D2FA's worst-case run-time performance and construction complexity.

"State reduction" schemes reduce the memory usage of a DFA by alleviating its state explosion. Since many regular expressions interact with others, the composite DFA for multiple regular expressions could possibly be extremely large. This is referred to as "state explosion". Yu et al. (See, e.g., F. Yu, Z. Chen, Y. Diao, T. V. Lakshman, and R. H. Katz, "Fast and Memory-Efficient Regular Expression Matching for Deep Packet Inspection," *Proc. of ACM/IEEE ANCS* (2006) (incorporated herein by reference).) and Jiang et al. (See, e.g., J. Jiang, Y. Xu, T. Pan, Y. Tang, and B. Liu, "Pattern-Based DFA for Memory-Efficient and Scalable Multiple Regular Expression Matching," *Proc. of IEEE ICC*, pp. 1-5 (May 2010) (incorporated herein by reference).) propose to combine regular expressions into multiple DFAs instead of one to eliminate the state explosion. Although state reduction schemes reduce memory usage, they usually require much more DFAs. This, in turn, increases the memory bandwidth demand linearly with the number of DFAs used. The XFA uses auxiliary memory to significantly reduce memory. (See, e.g., the references: R. Smith, C. Estan, and S. Jha, "XFA: Faster Signature Matching with Extended Automata," *IEEE Symposium on Security and Privacy* (2008) (incorporated herein by reference); and R. Smith, C. Estan, S. Jha, and S. Kong, "Deflating the Big Bang Fast and Scalable Deep Packet Inspection with Extended Finite Automata," *Proc. of ACM SIGCOMM* (2008) (incorporated herein by reference).) Unfortunately, however, the creation of XFA requires a lot of manual work, which is error-prone and inefficient. Further, its performance is non-deterministic. The reference, M. Becchi and S. Cadambi, "Memory-Efficient Regular Expression Search Using State Merging," *Proc. of IEEE INFOCOM*, pp. 1064-1072 (May 2007) (incorporated herein by reference) proposed an algorithm to merge DFA states by introducing labels on their input and output transitions. The reference, S. Kumar, B. Chandrasekaran, J. Turner, and G. Varghese, "Curing Regular Expressions Matching Algorithms from Insomnia, Amnesia, and Acalculia," *Proc. of ACM/IEEE ANCS* (2007) (incorporated herein by reference) proposed history-based finite automatons to record history information in matching which capture one of the major reasons for DFA state explosion and reduce the memory cost. However, recording history will increase the worst case complexity and thus compromise scalability.

"Hybrid Finite Automaton" schemes in this category aim at designing automatons fitted into the middle ground between NFAs and DFAs so that the strengths of both NFAs and DFAs can be obtained. Becchi et al. proposed a hybrid finite automaton called Hybrid-FA which consists of a head DFA and multiple tail-NFAs/tail-DFAs. (See, e.g., M. Becchi and P. Crowley, "A Hybrid Finite Automaton for Practical Deep Packet Inspection," *Proc. of ACM CoNEXT* (2007) (incorporated herein by reference).) Although a Hybrid-FA can achieve an average case memory bandwidth requirement similar to that of a single DFA with significantly reduced memory usage, its worst case memory bandwidth requirement is unpredictable and varies when the regular expression rule set is updated. Lazy DFA (See, e.g., R. Sommer and V. Paxson, "Enhancing Byte-Level Network Intrusion Detection Signatures with Context," *Proc. of the ACM Conference on Computer and Communications Security (CCS)* (2003) (incorporated herein by reference).) is another automaton used to leverage the advantages of both NFAs and DFAs. Its main function is to store only frequently used DFA states in memory, while leaving others in NFA representation. In case an uncommon DFA state is required, lazy DFA has to be extended at run-time from the NFA. Consequently, although the Lazy DFA automaton is fast and memory-efficient in common cases, in the worst case the whole DFA needs to be expanded, making it vulnerable to malicious traffic.

Thus, there is a need for improved techniques and apparatus for regular expression matching.

§2. SUMMARY OF THE INVENTION

The problem of automatons with too many states (DFA) or too many possible simultaneously active states (NFA) is solved by regrouping NFA active state combination associated with each DFA state into up to a user-selectable maximum number (b) of distinct subsets such that the total number of distinct subsets is minimized. Some example embodiments consistent with the present invention generate a tunable finite automaton ("TFA") from an NFA having a finite set of states, a finite set of input symbols and a transition function covering each state and input symbol by (a) receiving, as input, both (1) a DFA representation of the NFA, and (2) a parameter, b, defining a maximum number of concurrent active states; (b) regrouping an NFA active state combination associated with each state of the DFA into up to b subsets, with the objective of minimizing the number of total distinct subsets; (c) generating a TFA including one TFA state for each of the distinct subsets, wherein the generated TFA has, at most, b concurrent active TFA states; and (d) storing the generated TFA.

A generated TFA data structure is provided for emulating, with, at most, b concurrent active states, an NFA having a finite set of states, a finite set of input symbols and a transition function covering each state and input symbol. The generated TFA data structure includes (1) a plurality of TFA states, up to b TFA states representing any NFA active state combination, each of the plurality of states having at least one associated state label covering the finite set of input symbols, and (2) a table including a plurality of entries, each of the plurality of entries (i) including pointers to up to b TFA states, each entry (including up to b pointers) corresponds to one of the NFA active state combinations, and (ii) being indexed by an NFA active state combination corresponding to a state of a DFA representation of the NFA. The generated TFA data structure may be used for determining whether an arbitrary sequence of input symbols matches a set of regular expressions represented by the NFA by (a) defining each of up to b of the plurality of TFA states as an initial state; (b) receiving a next symbol of the arbitrary sequence of input symbols; (c) using the next symbol to determine a state label associated with each of the up to b initial TFA states; (d) using a union of the up to b state labels to determine one of the plurality of entries of the table; (e) deactivating each of the up to b initial TFA states; (f) activating a next set of up to b TFA states using pointers stored in the entry; (g) determining if the next set of up to b active TFA states includes a match TFA state; (h) if it was determined that the next set of up to b active TFA states include at least one match TFA state, then indicating a match corresponding to the match TFA state(s); and (i) if there are any unprocessed symbols in the arbitrary sequence of input symbols, then (1) receiving, with the computer system, a next symbol of the arbitrary sequence of input symbols, (2) using the next symbol to determine a state label associated with each of the up to b active TFA states, (3) using a union of the up to b state labels to determine a next one of the plurality of entries of the table, (4) deactivating the active TFA states, (5) activating a next set of up to b TFA states using pointers stored in the entry; (6) determining if the next set of up to b active TFA states include a match TFA state, (7) if it was determined that the next set of up to b active TFA states include at least one match TFA state, then indicating a match corresponding to the match TFA state(s), and (8) if there are any unprocessed symbols in the arbitrary sequence of input symbols, repeating acts (i)(1) through (i)(8) while there are any unprocessed symbols of the arbitrary sequence of input symbols.

§3. BRIEF DESCRIPTION OF THE DRAWINGS

Figure 6:
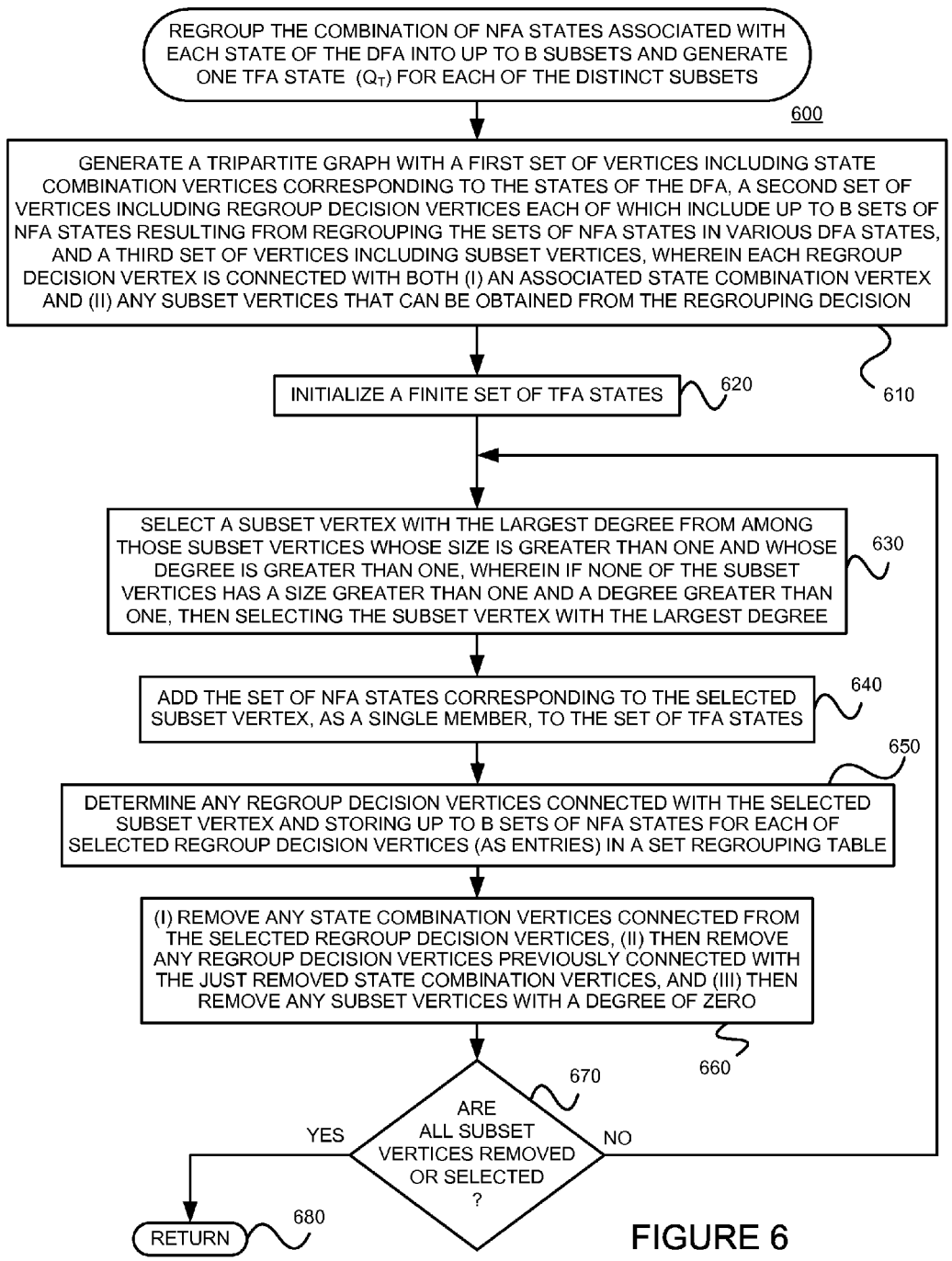
FIG. 6 is a flow diagram of an example method for regrouping (e.g., splitting) the NFA active state combination associated with each DFA state into, at most, b distinct subsets.

FIGS. 7A-7J provide an example illustrating operations of an example method consistent with FIG. 6.

Figure 8:
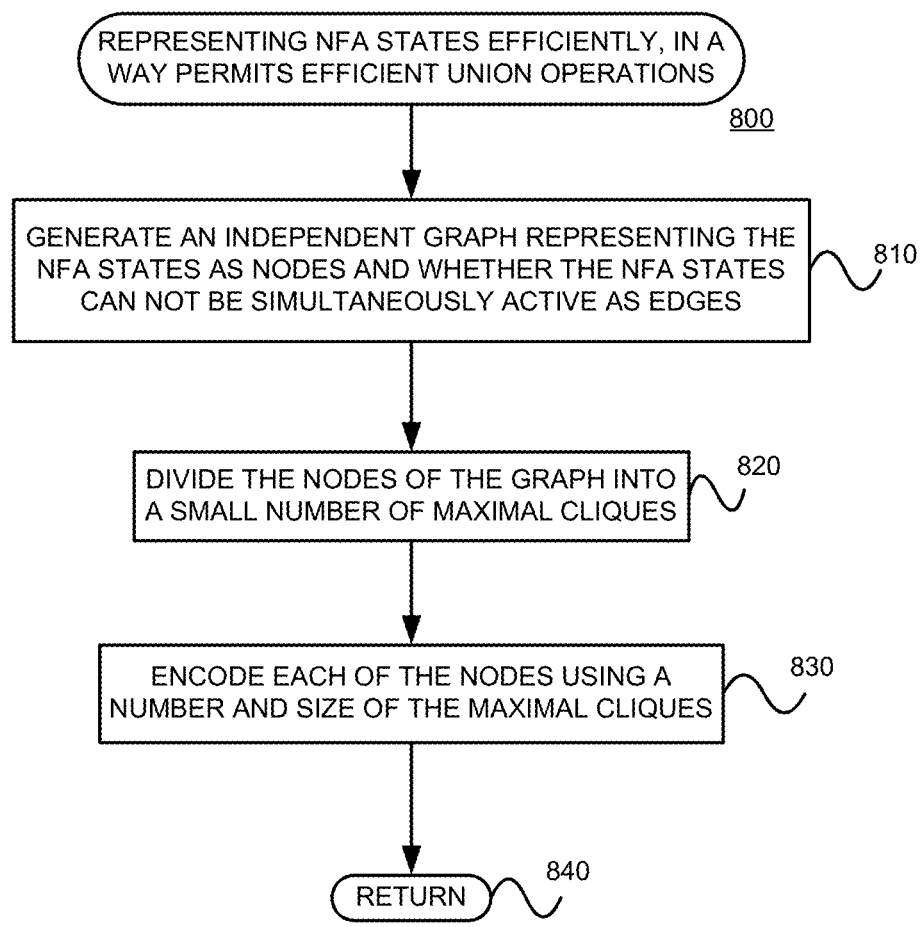

FIG. 8 is a flow diagram of an example method for representing NFA states efficiently, in a way that permits efficient union operations.

Figure 9:
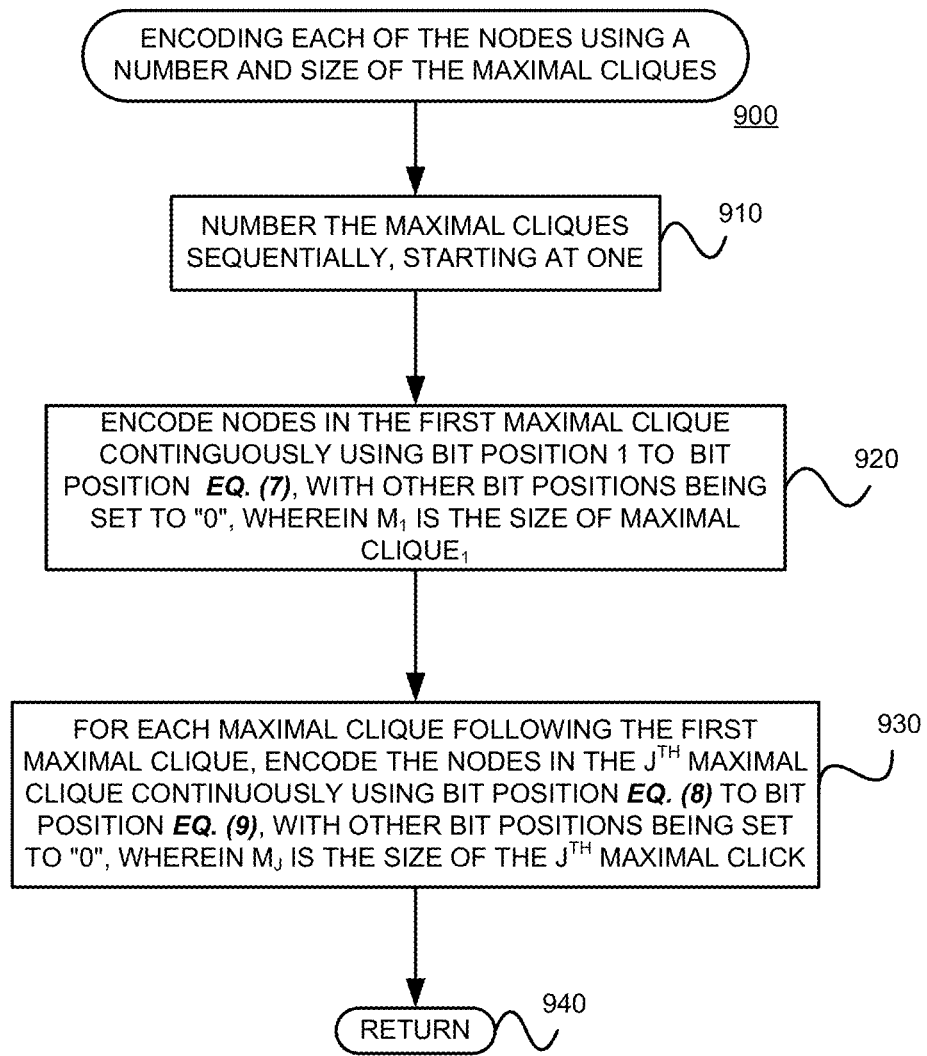

FIG. 9 is a flow diagram of an example method for encoding nodes of an independent graph representing NFA states using a number and size of maximal cliques.

Figure 11:
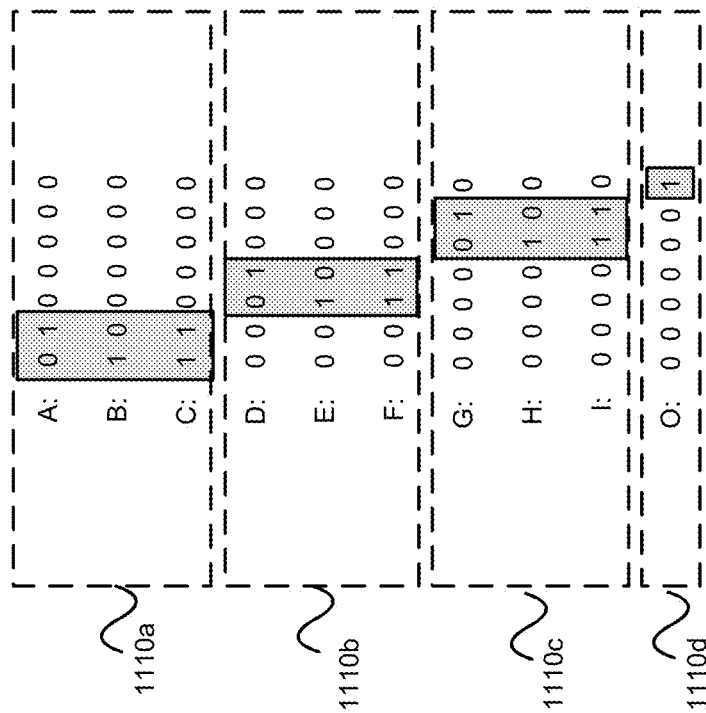
Figure 10:
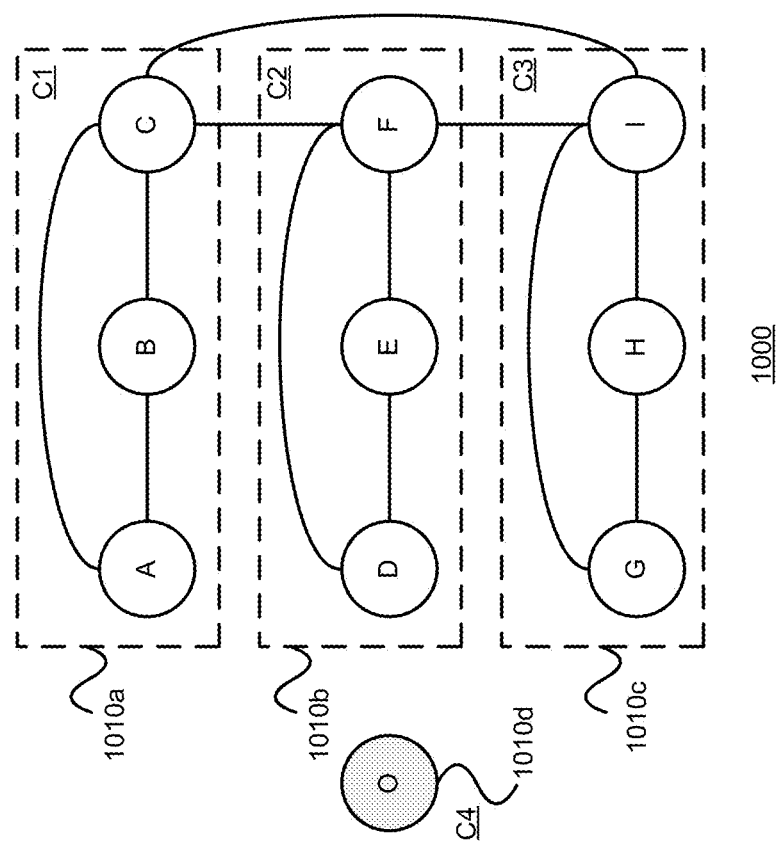

FIGS. 10 and 11 provide an example illustrating operations of example methods consistent with FIGS. 8 and 9.

Figure 12A:
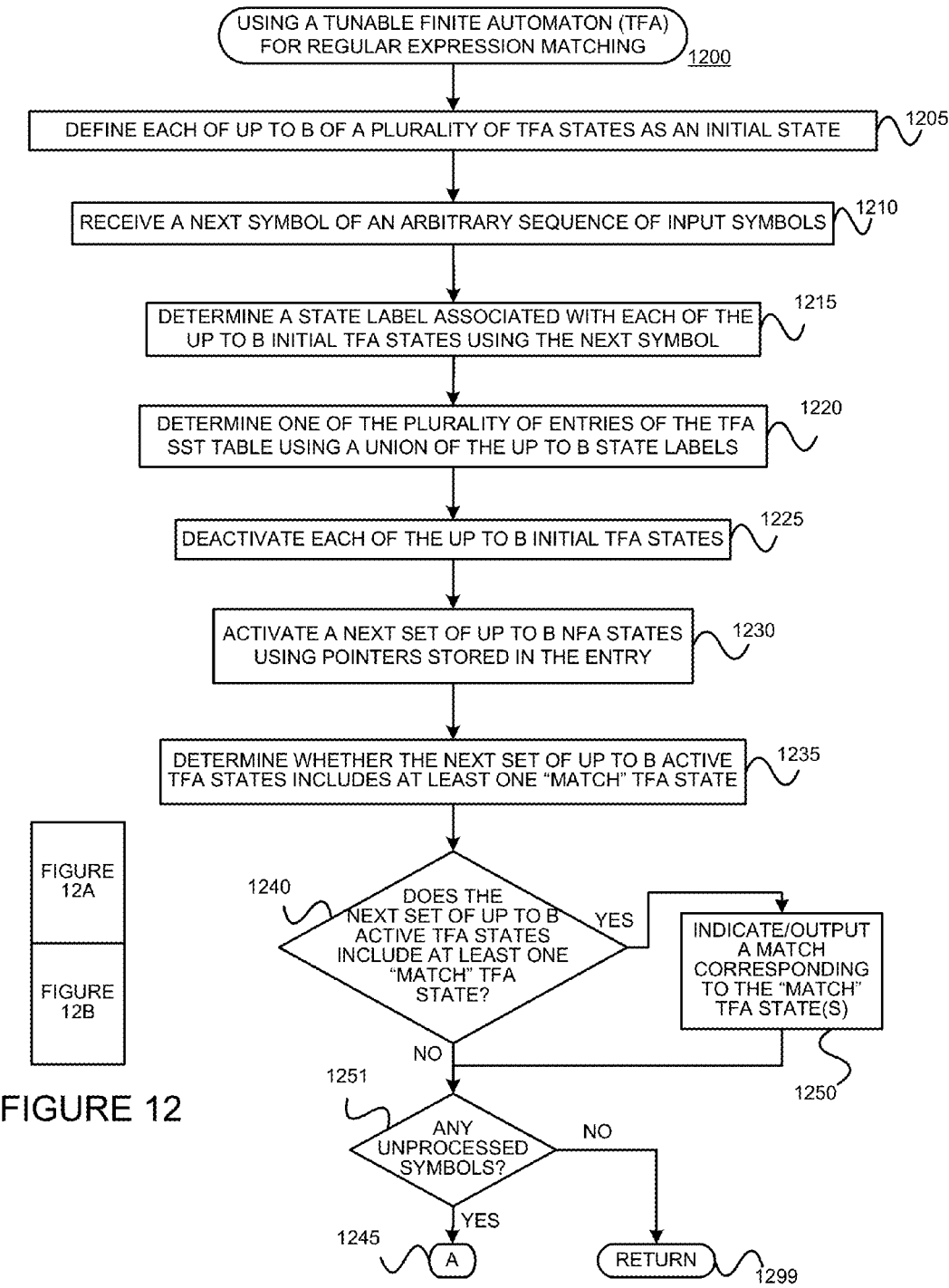
Figure 12B:
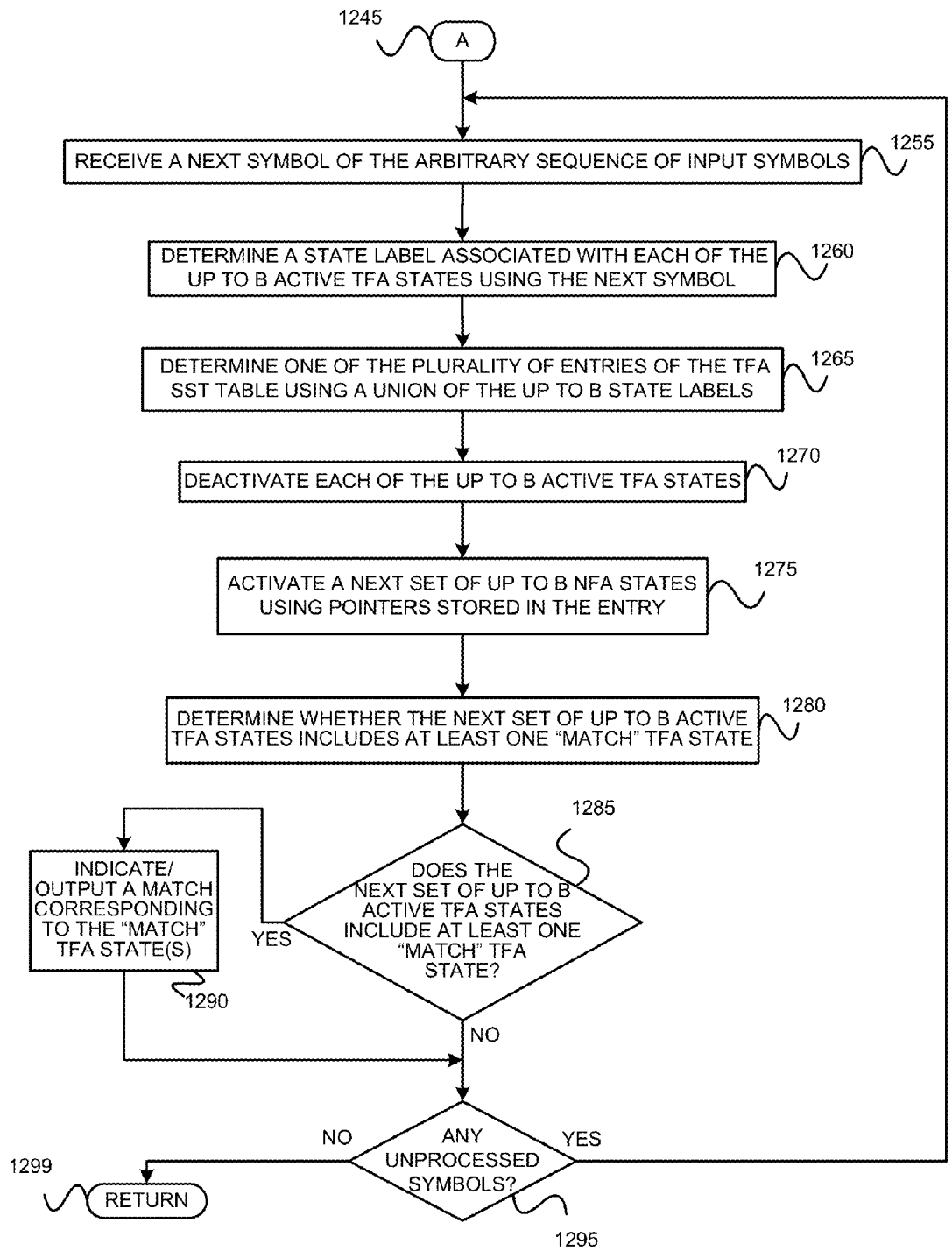

FIG. 12, which includes FIGS. 12A and 12B, is a flow diagram of an example method for using a TFA for regular expression matching.

Figure 13A:
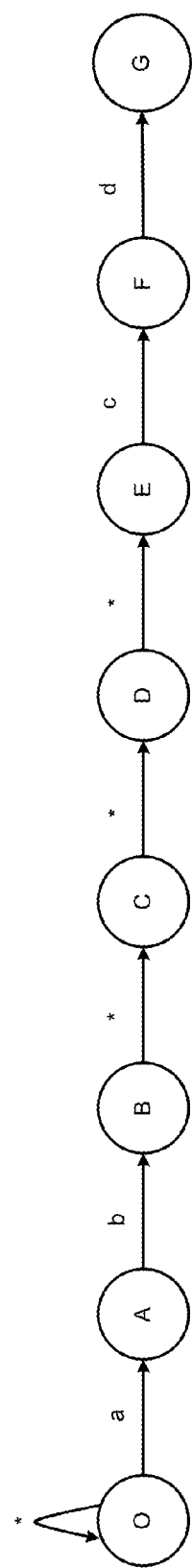
Figure 13B:
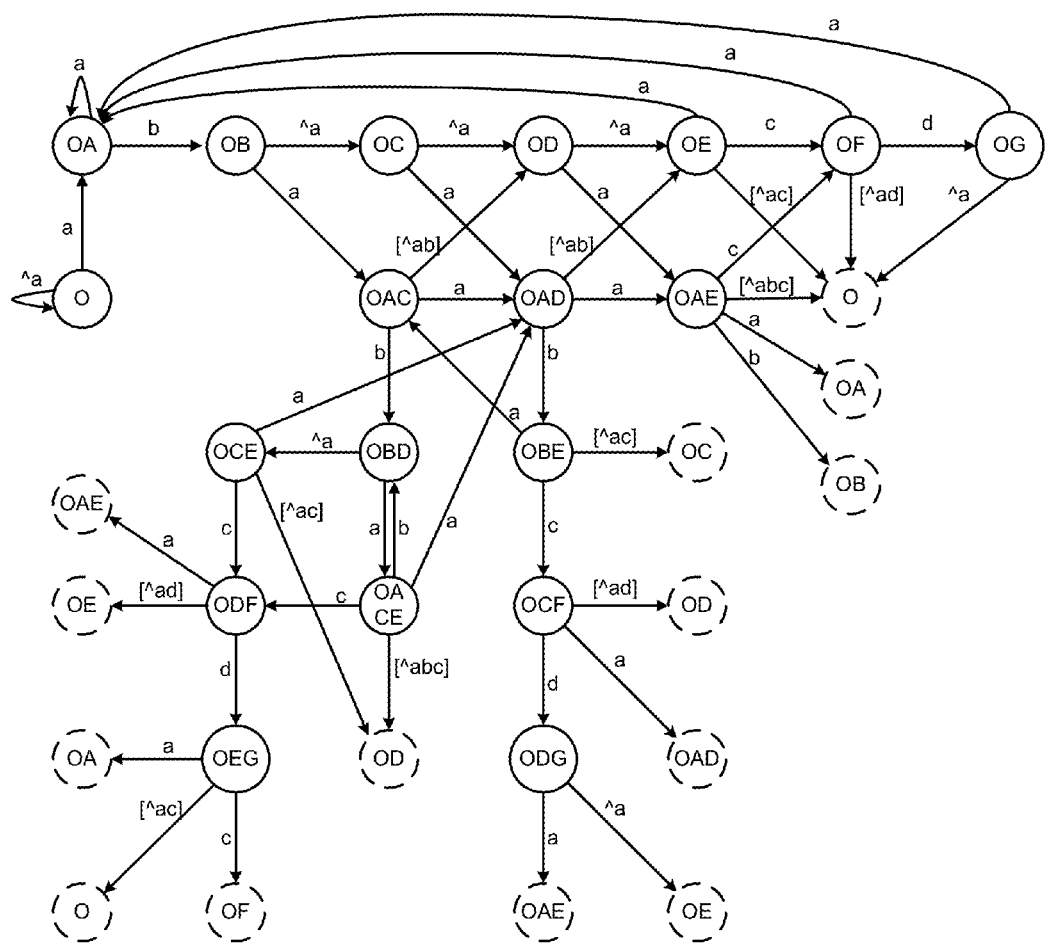
Figure 13C:
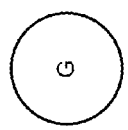
Figure 13C:
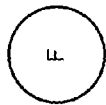
Figure 13C:
Figure 13C:
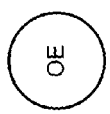
Figure 13C:
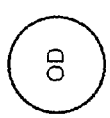
Figure 13C:
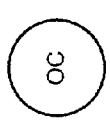
Figure 13C:
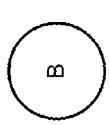
Figure 13C:
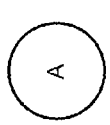
Figure 13C:
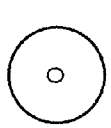

FIGS. 13A, 13B and 13C illustrate an NFA, a DFA, and a 2-TFA, respectively, representation of a single regular expression.

Figure 14:
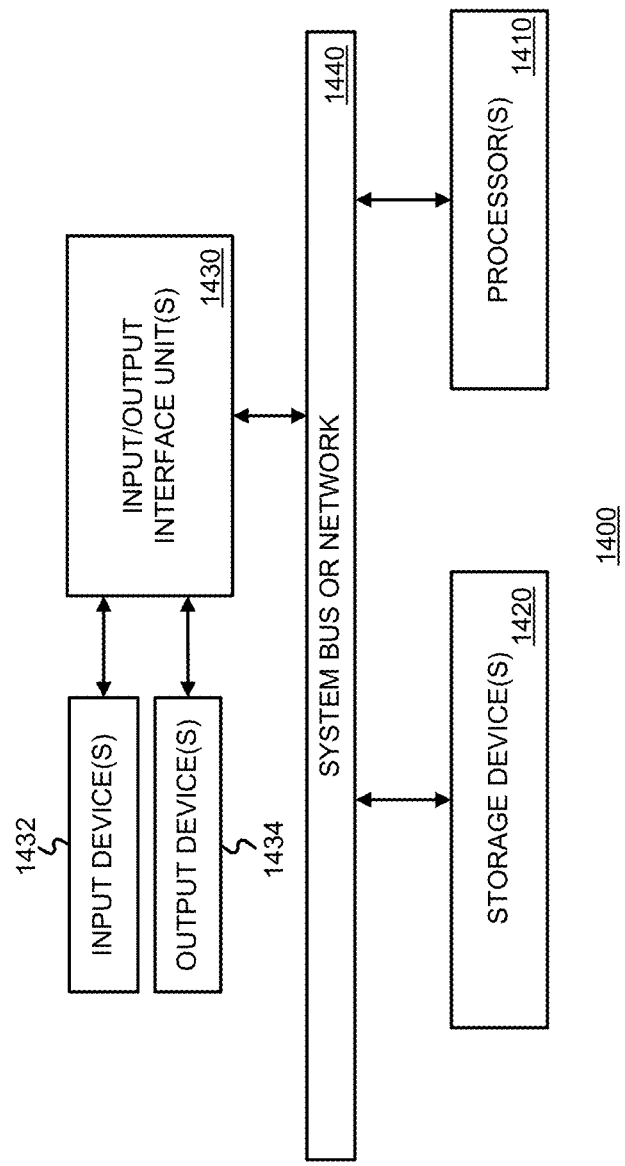

FIG. 14 is a block diagram of an example apparatus that may perform various operations and store various information.

§4. DETAILED DESCRIPTION

A new automaton representation for regular expression matching, called a Tunable Finite Automaton ("TFA"), is described. It resolves the DFAs' state explosion problem and NFAs' unpredictable performance problem. A few TFA states are used to remember the matching status traditionally tracked by a single DFA state such that the number of TFA states required to represent the information stored on the counterpart DFA is much smaller than that of DFA states. Unlike an NFA, a TFA has the number of concurrent active states strictly bounded by a bound factor b, which is a parameter that can be tuned during the construction of the TFA according to needs for speed and/or storage.

The present invention may involve novel methods, apparatus, message formats, and/or data structures to generate and/or use TFAs, to regroup NFA active state combinations to minimize the total number of distinct subsets, and/or to represent NFA states efficiently, in a way permits efficient union operations. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

In the following, some of the terminology used in the description is defined in §4.1. The motivation for our inventions are set forth in §4.2. A TFA consistent with the present invention is defined in §4.3. How to generate a TFA consistent with the present invention is described in §4.4. Section 4.4 also describes our inventions related to (1) regrouping NFA active state combinations to minimize the total number of distinct subsets, and (2) representing NFA states efficiently, in a way permits efficient union operations. The resulting TFA data structures are described in §4.5. Using the TFA data structures for regular expression matching is described in §4.6. Example apparatus that may be used to perform various operations and store various information, in a manner consistent with the present invention are described in §4.7. Performance evaluations are presented in §4.8. Finally, some conclusions about some of the example embodiments consistent with the present invention are provided in §4.9.

§4.1 Terminology Used

A "regular expression," often called a pattern, is an expression that specifies a set of strings. To specify such sets of strings, rules are often used since they are usually more concise than lists of a set's members. For example, the set containing the three strings "Handel", "Händel", and "Haendel" can be specified by the pattern H(ä|ae?)ndel (or alternatively, it is said that the pattern matches each of the three strings).

A vertical bar (|) acts as a Boolean OR and separates alternatives. For example, gray|grey can match "gray" or "grey".

Parentheses are used to define the scope and precedence of the operators. For example, gray|grey and gr(a|e)y are equivalent patterns which both describe the set of "gray" and "grey".

A "quantifier" after a token (such as a character) or group specifies how often that preceding element is allowed to occur (i.e., how often it can repeat). The most common quantifiers are the question mark (?), the asterisk (*), and the plus sign (+). The question mark (?) indicates there is zero or one of the preceding element. For example, colou?r matches both "color" and "colour". The asterisk (*) indicates there is zero or more of the preceding element. For example, ab*c matches "ac", "abc", "abbc", "abbbc", and so on. The plus sign (+) indicates there is one or more of the preceding element. For example, ab+c matches "abc", "abbc", "abbbc", and so on, but not "ac". The power sign (^) indicates any character that is not the character following the ^. A period (.) indicates zero or more of any character. A bracket expression ([ ]) including one or more characters matches a single character that is contained within the brackets. The following examples illustrate some uses of quantifiers:

a|b* denotes {ε, a, b, bb, bbb, . . . }.

(a|b)* denotes the set of all strings with no symbols other than a and b, including the empty string: {ε, a, b, aa, ab, ba, bb, aaa, . . . }.

ab*(c|ε) denotes the set of strings starting with a, then zero or more bs and finally optionally a c: {a, ac, ab, abc, abb, abbc, . . . }.

a.c matches "abc", etc., but [a,c] matches only "a", ".", or "c".

[abc] matches "a", "b", or "c".

[a-z] specifies a range which matches any lowercase letter from "a" to "z".

[abcx-z] matches "a", "b", "c", "x", "y", or "z", as does [a-cx-z].

[^abc] matches any character other than "a", "b", or "c".

[^a-z] matches any single character that is not a lowercase letter from "a" to "z". at matches any three-character string ending with "at", including "hat", "cat", and "bat".

[hc]at matches "hat" and "cat".

[^b]at matches all strings matched by at except "bat".

^[hc]at matches "hat" and "cat", but only at the beginning of the string or line.

[hc]at$ matches "hat" and "cat", but only at the end of the string or line.

\[.\] matches any single character surrounded by "[" and "]" since the brackets are escaped, for example: "[a]" and "[b]".

[hc]+at matches "hat", "cat", "hhat", "chat", "hcat", "ccchat", and so on, but not "at".

[hc]?at matches "hat", "cat", and "at".

[hc]* at matches "hat", "cat", "hhat", "chat", "hcat", "ccchat", "at", and so on.

cat|dog matches "cat" or "dog".

In this application, lowercase letters are used to denote input characters; single capital letters denote NFA states, while the strings of capital letters denote DFA and TFA states.

One "time slot" is defined as the time period required to process a character. It is a constant (or variable) if the automaton has a deterministic (or nondeterministic) performance.

§4.2 Motivation

In this section, the time-space tradeoff between an NFA and its counterpart DFA is reviewed by way of example. Then, the way that a TFA, consistent with the present invention, combines both of their strengths is described.

Figure 1B:
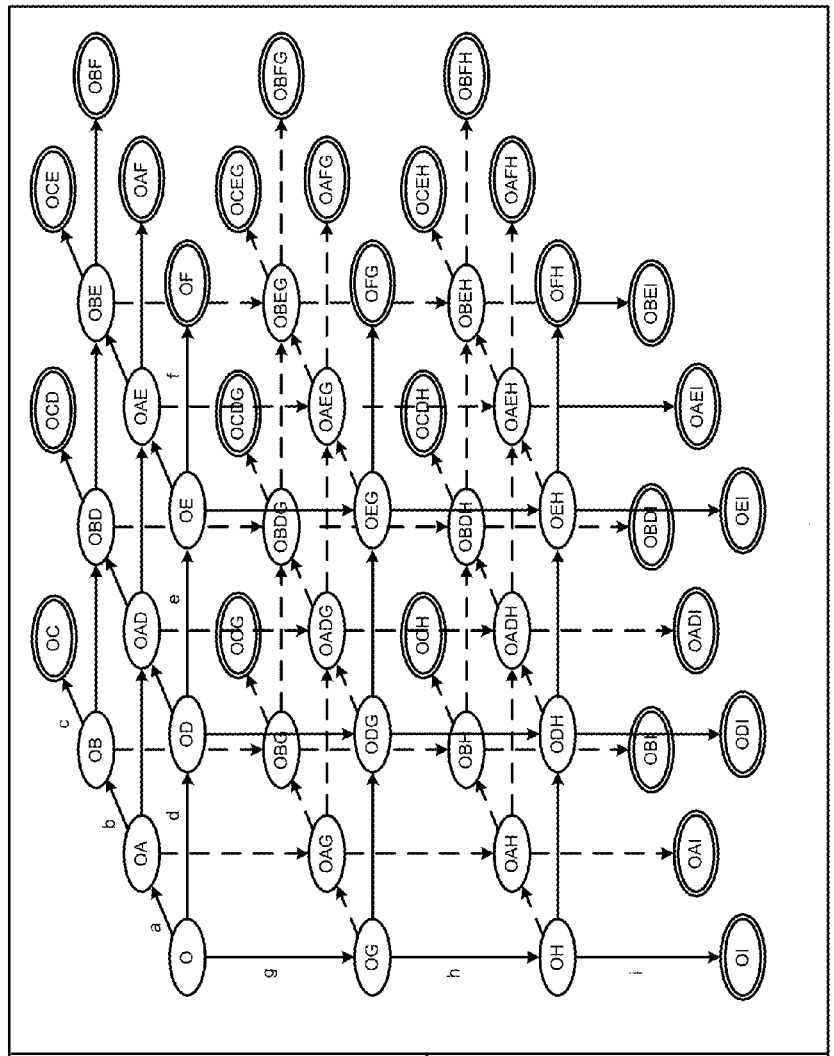
FIGS. 1A, 1B and 1C illustrate a non-deterministic finite automaton (NFA), a deterministic finite automaton (DFA), and a 2-tunable finite automaton (2-TFA), respectively, representations of a set of regular expressions.
Figure 1A:
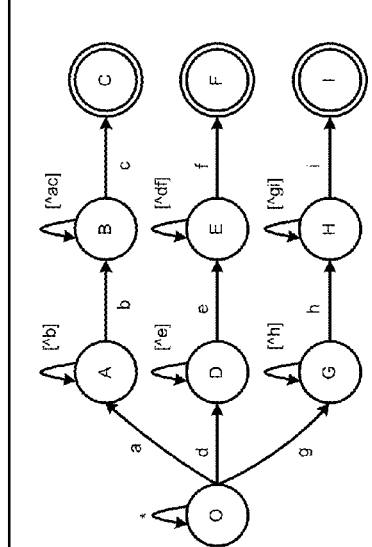

FIGS. 1A and 1B show an NFA and a DFA, respectively, representing the same set of regular expressions (i.e., .*a.*b [a]*c, .*d.*e[d]*f, .*g.*h[g]*i), with the alphabet E={a, b, . . . , i}. Notice that although the NFA and DFA have the same functionality, the state number in the DFA (54) of FIG. 1B is 5.4 times that in the NFA (10) of FIG. 1A. Although the NFA requires much less memory than the DFA, its memory bandwidth requirement is four times that of the DFA. This is because the NFA may have up to four concurrent active states while the DFA only has one. Consider an input string of "adegf". The initial active state combination of NFA is {O}. The active state combinations of the NFA after the scanning of each of these characters are {O,A}, {O,A,D}, {O,A,E}, {O,A,E,G}, and {O,A,F,G}. Notice that after character "g" is read, there are four states: i.e., "O", "A", "E", and "G", active simultaneously in the NFA. Unlike the NFA, the DFA has only one state activated during the entire matching. Consider the same input string "adegf". The initial state of DFA is "O". The states visited by the DFA after each character is scanned are "OA", "OAD", "OAE", "OAEG", and "OAFG".

The state explosion of the DFA occurs because there are a large number of NFA active state combinations and the DFA needs one state to represent each NFA active state combination.

To reduce the DFA size (denoted by $N_D$), one possible solution is to allow multiple automaton states (bounded by a bound factor b) to represent each combination of NFA active states. In other words, up to b active states are permitted in the new automaton, referred to as Tunable Finite Automaton (TFA). For simplicity, this application uses b-TFA to denote a TFA with up to b active states. To see the potential of a TFA, let $N_T$ be the number of TFA states. The number of all possible statuses (denoted by P) that can be represented by at most b active states of the b-TFA is (normally, $b<<N_T/2$):

$$P = \sum_{i=1}^{b} \binom{N_T}{i} = O(N_T^b) \tag{1}$$

Thus, a TFA with $N_T=O(\log_b(N_D))$ states can represent a DFA with $N_D$ states.

§4.2.1 TFA States

The following example illustrates the advantage of a TFA. Suppose one wants to design a 2-TFA based on the NFA in FIG. 1A. First, the corresponding DFA (FIG. 1B), which includes all valid combinations of NFA active states, is provided. Then, each combination of NFA active states is regrouped (e.g., split) into two subsets, with the goal of minimizing the number of distinct subsets. One 2-TFA state is generated for each distinct subset. For instance, the NFA active state combination {O,A,D,G} can be split into {O,G} and {A,D}, and represented by two 2-TFA states "OG" and "AD".

Figure 1C:
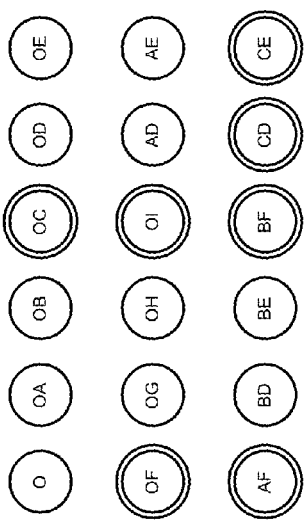

FIG. 1C shows a 2-TFA with only 18 states. (Only the 2-TFA states are given. The details of how it works will be described below.) Any valid combination of NFA active states can always be exactly covered by (at most) two 2-TFA states. The 2-TFA (18 states, at most 2 active) achieves a significant reduction in the number of states compared to the corresponding DFA (18 states versus 54 states) and a significant reduction in the memory bandwidth requirement compared to the NFA (2 active states in the worst case versus 4 active states in the worst case).

§4.2.2 TFA Transitions

A challenging aspect of designing a TFA is to connect TFA states with the proper transitions and allow the TFA to emulate the corresponding NFA or DFA. Recall that when an NFA scans an input string, the real-time matching status is tracked by its concurrent active states. To allow a TFA to emulate an NFA, one needs to guarantee that the active states of the NFA can be recovered from the active states of the TFA after each character is processed. Referring again to the NFA in FIG. 1A, suppose that a 2-TFA as in FIG. 1C can emulate the NFA until time slot t. At the end of time slot t, suppose there are two active states in the 2-TFA ("OD" and "OG") and the active state combination in the corresponding NFA is {O,D,G}. Now assume that the character read in time slot t+1 is an "a". The active state combination of NFA at the end of time slot t+1 would be {O,A,D,G}. The challenge is how to operate the 2-TFA to make it work exactly as the NFA does in time slot t+1. If the two active states "OD" and "OG" are run separately, their next active states should be "OAD" and "OAG", respectively. However, these next active states are not in the state set given in FIG. 1C. Adding new states "OAD" and "OAG" into the state set of 2-TFA will result in a bigger automaton.

A novel way to operate a TFA to avoid the foregoing problem is described. Briefly stated, rather than running TFA active states individually in each time slot to get the next TFA active states, the active state combination of the NFA is first recovered by combining the results obtained by the individual TFA states. Then a table, referred to as a "Set Regrouping Table" (SRT), is accessed to learn the next TFA active states whose combination is equal to this NFA active state combination. In this way, no extra TFA states need to be added.

§4.3 Definition of a Tunable Finite Automaton (TFA)

A TFA consistent with the present invention can be generated from any NFA. In this section, formal definitions of NFAs, DFAs, and TFAs are provided. An NFA can be represented formally by a 5-tuple $<Q_N, \Sigma, \delta_N, q_N, F_N>$, consisting of:
- a finite set of NFA states $Q_N$;
- a finite set of input symbols $\Sigma$;
- a transition function $\delta_N: Q_N \times \Sigma \rightarrow P(Q_N)$;
- an initial state $q_N$; and
- a set of accept states $F_N \subseteq Q_N$, where $P(Q_N)$ denotes the power set of $Q_N$.

To be deterministic, a DFA consists of the similar 5-tuple $<Q_D, \Sigma, \delta_D, q_D, F_D>$ but with a transition function $\delta_D: Q_D \times \Sigma \rightarrow Q_D$ that transfers the current state to only one next state if any symbol is read.

A b-TFA extends the 5-tuple definition of DFA/NFA, by introducing the set regrouping function SR. Formally, a b-TFA is a 6-tuple $<Q_T, \Sigma, \delta_T, I, F_T, SR>$, consisting of:
- a finite set of TFA states $Q_T$;
- a finite set of input symbols $\Sigma$;
- a transition function $\delta_T: Q_T \times \Sigma \rightarrow P(Q_N)$;
- a set of initial states $I \subseteq Q_T$, $|I| \leq b$;
- a set of accept states $F_T \subseteq Q_T$; and
- a set regrouping function SR: $Q_D \rightarrow (Q_T)^b \cup \ldots \cup (Q_T)^1$.

§4.4 Generating a TFA Consistent with the Present Invention

Figures 2A, 2B:
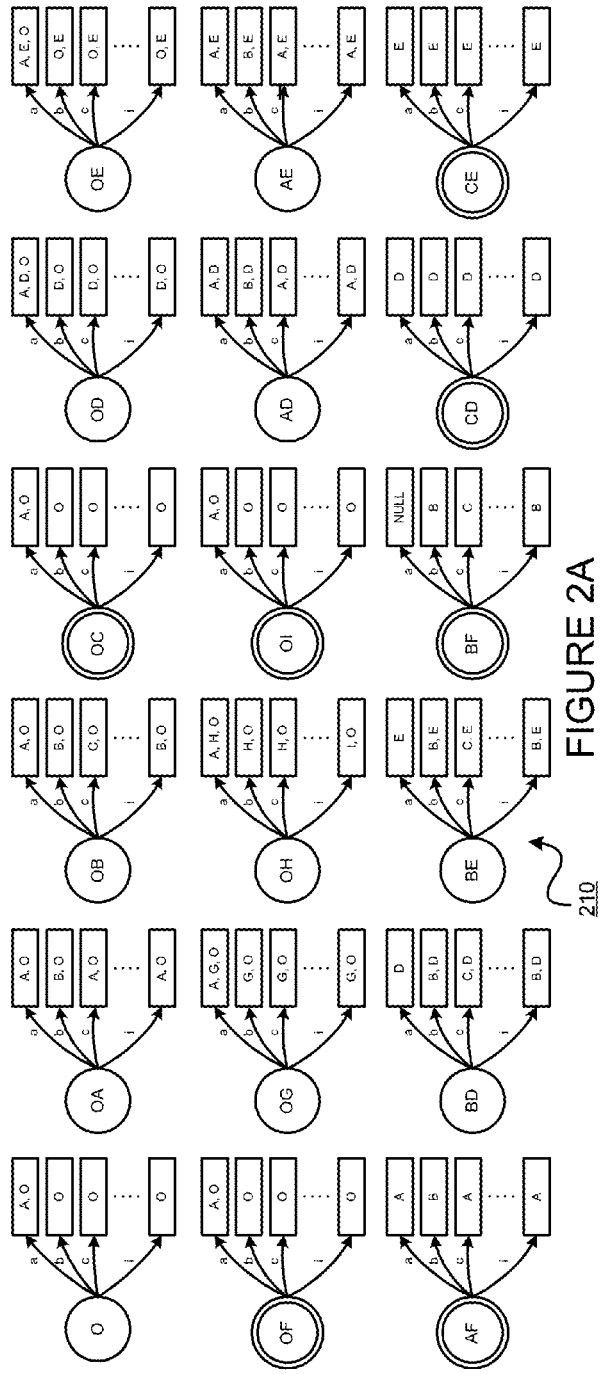
FIGS. 2A and 2B represent nodes of a 2-TFA and a set regrouped (e.g., split) hash table of the 2-TFA, respectively, generated from the NFA of FIG. 1A.

This section describes how to generate a TFA based on a given NFA. An implemented TFA, based on its definition, logically includes two components: (1) a TFA structure that implements $Q_T, \Sigma, \delta_T, I, F_T$; and (2) a Set Regrouping Table ("SRT") that implements SR. Generated from the NFA of FIG. 1A, FIG. 2A shows a 2-TFA structure (with 18 isolated states) 210 and FIG. 2B shows an SRT table. The 18 states of the 2-TFA structure 210 include O, OA, OB, OC, OD, OE, OF, OG, OH, OI, AD, AE, AF, BD, BE, BF, CD, and CE. Each entry of the SRT table 220 corresponds to one combination of NFA active states (i.e., a DFA state) recording how to regroup (e.g., split) the combination into multiple TFA states (the memory addresses of the TFA states are stored).

Figure 3:
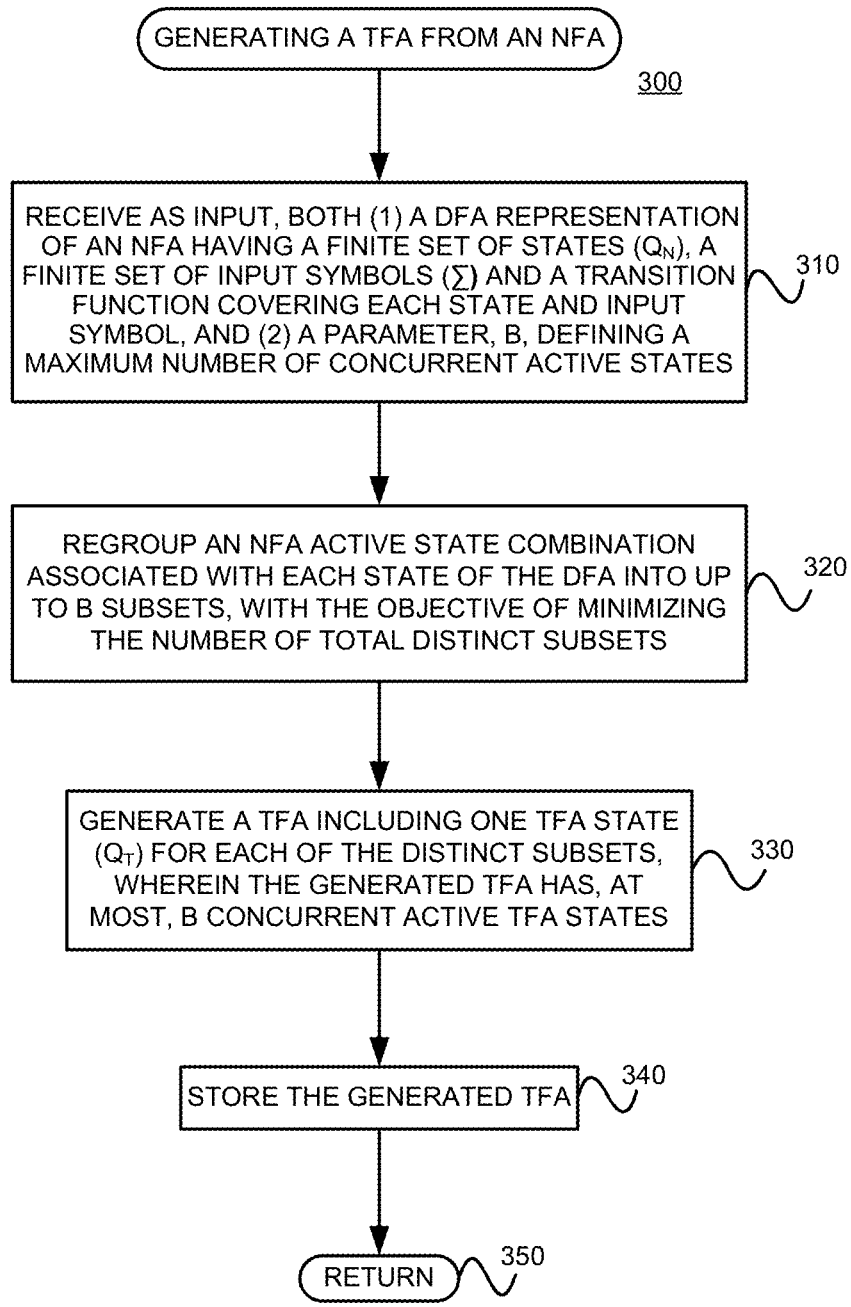
FIG. 3 is a flow diagram of an example method for generating a TFA from an NFA.

FIG. 3 is a flow diagram of an example method 300 for generating a b-TFA from an NFA. Recall that the NFA has a finite set of states ($Q_N$), a finite set of input symbols ($\Sigma$) and a transition function covering each state and input symbol. The method 300 receives, as input, both (1) a DFA representation of the NFA, and (2) a parameter, b, defining a maximum number of concurrent active states. (Block 310) Then, an NFA active state combination associated with each state of the DFA is regrouped into up to b subsets, with the objective of minimizing the number of total distinct subsets. (Block 320). The method 300 then generates a TFA including one TFA state ($Q_T$) for each of the distinct subsets, wherein the generated TFA has, at most, b concurrent active TFA states. (Block 330) Finally, the generated TFA is stored (Block 340) before the method 300 is left (Node 350).

Each of the NFA, the DFA and the TFA may represent a set of regular expressions.

As can be appreciated from the foregoing, using the method 300 of FIG. 3, the problem of automatons with too many states (DFA) or too many possible simultaneously active states (NFA) is solved by regrouping NFA active state combination with each associated DFA state into up to a user-selectable maximum number (b) of distinct subsets such that a number of total number of distinct subsets is minimized.

Figure 4:
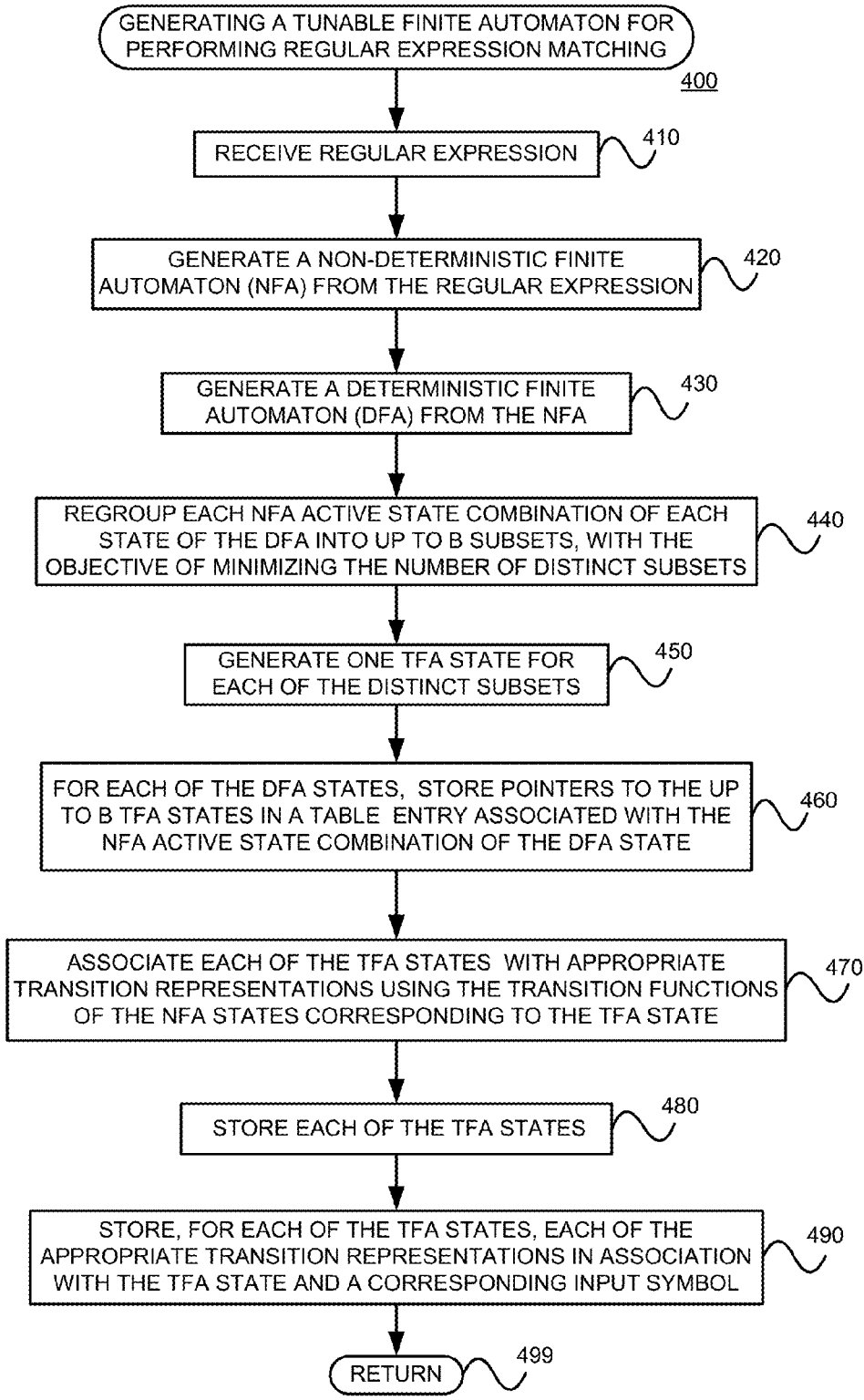
FIG. 4 is a flow diagram of another example method for generating a TFA from an NFA.

FIG. 4 is a flow diagram of another example method 400 for generating a TFA from an NFA. Recall, once again, that the NFA has a finite set of states ($Q_N$), a finite set of input symbols ($\Sigma$) and a transition function covering each state and input symbol. Recall also that the TFA has, at most, b concurrent active states. The method 400 may receive, as input, a DFA representation of the NFA. Alternatively, the method 400 may receive, as input, a regular expression (Block 410), generate the NFA from the regular expression (e.g., using a known technique) (Block 420), and generate the received DFA representation of the NFA (e.g., using a subset construction scheme such as that described in the reference, J. E. Hoperoft, R. Motwani, and J. D. Ullman, *Introduction to Automata Theory, Languages, and Computation-International Edition* (2nd Ed) (Addison-Wesley, 2003) (incorporated herein by reference).) such that states of the generated DFA provide all valid active state combinations of the NFA (Block 430). Next, the method 400 regroups the NFA active state combination associated with each state of the DFA into up to b subsets, with the objective of minimizing the number of total distinct subsets. (Block 440) One TFA state ($Q_T$) is then generated for each of the distinct subsets. (Block 450) For each of the DFA states, the method 400 stores pointers to the up to b TFA states in a table (SRT) entry associated with the NFA active state combination of the DFA state. (Block 460) Then, each of the TFA states ($Q_T$) is associated with appropriate transition representations using the transition functions of the NFA states corresponding to the TFA state. (Block 470) Each of the TFA states ($Q_T$) is stored (Block 480), and, for each of the TFA states, each of the appropriate transition representations (state labels) is stored in association with the TFA state and a corresponding input symbol (Block 490) before the method 400 is left (Node 499).

Referring back to block 430 of FIG. 4, in some example embodiments consistent with the present invention, the DFA states may be generated using the subset construction scheme. (Recall, e.g., the text, J. E. Hoperoft, R. Motwani, and J. D. Ullman, *Introduction to Automata Theory, Languages, and Computation—International Edition* (2*nd Ed*) (Addison-Wesley, 2003). The obtained DFA states provide valid NFA active state combinations.

Referring back to blocks 320 and 330 of FIG. 3, and blocks 440 and 450 of FIG. 4, each NFA active state combination is regrouped into up to b subsets, with the objective of minimizing the number of distinct subsets, and one TFA state is generated for each distinct subset. In this way, the TFA state set ($Q_T$) and the set regrouping function (SR) may be obtained.

Referring back to block 470, in some example embodiments consistent with the present invention, different from traditional automatons, outgoing transitions of TFA states do not point to other TFA states directly. Instead, they point to a data structure (referred to as a "state label") which contains a set of NFA state IDs. (See FIG. 2A.) Given a TFA state s, its state label associated with character "c" includes all NFA states that can be reached via character "c" from the NFA states associated with TFA state s. For instance, consider TFA state "AD" in FIG. 2A. Its state label associated with character "b" is {B,D}, which can be obtained by running state "A" and "D" using "b" in the NFA.

Although not shown in FIGS. 3 and 4, the methods 300 and 400 may further determine a set of initial states (I) and a set of accept (or "match") states ($F_T$). The set of initial states I includes TFA states split from the initial state of the counterpart DFA (i.e., $q_D$). The set of accept or match states $F_T$ includes TFA states associated with at least one NFA accept state. Then the TFA state set $Q_T$ and the set regrouping function SR are obtained.

The transition function $\delta_T$ may be determined as follows. Different from traditional automatons, outgoing transitions of TFA states do not point to other TFA states. Instead, they point to a data structure called state label, which contains a set of NFA state IDs. Given a TFA state s, its state label associated with character "c" includes all NFA states that can be reached via character "c" from the NFA states associated with TFA state s. For instance, consider TFA state "AD" in FIG. 2(a). Its state label associated with character "b" is {B,D}, which can be obtained by running state "A" and "D" using "b" in the NFA.

Note that although the construction of a TFA requires obtaining all DFA states via subset construction, it does not require the generation of a complete DFA since no DFA transition is computed or stored. In some experiments conducted by the present inventors, the total memory usage during this procedure is only 1% of that for compiling the complete DFA.

After either method 300 or method 400 is complete, a non-transitory computer-readable storage medium may store a data structure for emulating, with, at most, b concurrent active states, an NFA having a finite set of states ($Q_N$), a finite set of input symbols ($\Sigma$) and a transition function covering each state and input symbol, the data structure including (a) a plurality of TFA states ($Q_T$), up to b TFA states representing any NFA active state combination, each of the plurality of states having at least one associated state label covering the finite set of input symbols; and (b) a table (SRT) including a plurality of entries, each of the plurality of entries (1) including up to b pointers to up to b TFA states, the union of the up to b TFA states corresponding to one of the NFA active state combinations, and (2) being indexed by an NFA active state combination corresponding to a state of a DFA representation of the NFA.

§4.4.1 Regrouping NFA Active State Combinations

§4.4.1.1 Set Regrouping Problem

The set regrouping problem is how to regroup (e.g., split) each NFA active state combination into up to b non-empty subsets (overlaps among the subsets are allowed). To get a small TFA, the number of distinct subsets produced by the set regrouping should be minimized. The set regrouping problem can also be rephrased to a special set covering problem. That is, the set regrouping problem can be considered to be finding a minimal number of subsets from the NFA state set, so that for any valid NFA active state combination, up to b subsets to exactly cover it can always be found. In the following, the set regrouping ("SR") problem with a bound factor of b is denoted as b-SR problem, and is formalized below in Table II based on notations in Table I. The inventors note that the b-SR problem is an NP-hard problem for any b>1. (The proof is omitted.) Thus, no optimal solution can be found in polynomial time. Example methods for solving the b-SR problem are described below.

TABLE I

NOTATIONS USED IN THE b-SR PROBLEM

| NOTATIONS | DESCRIPTIONS |
| --- | --- |
| $Q_N$ | The set of all NFA states |
| $N_D$ | The number of different combinations of NFA active states (i.e., the number of states in the corresponding DFA, $N_D = |Q_D|$) |
| $S_i$ | The i-th combination of NFA active states (i = 1, . . . , $N_D$) |
| $S_{i,j}$ | The j-th subset regrouped from $S_i$ (j = 1, . . . , b) |
| $Q_T$ | The union of $S_{i,j}$ (i = 1, . . . , $N_D$; j = 1, . . . , b) |

TABLE II

SET REGROUP PROBLEM

SUBJECT TO:

$$\bigcup_j S_{i,j} = S_i; (i = 1, \ldots, N_D; j = 1, \ldots, b) \quad (2)$$

$$Q_T = \{S_{i,j} | i = 1, \ldots, N_D; j = 1, \ldots, b\} - \{\emptyset\} \quad (3)$$

OBJECTIVE:

$$\text{Minimize } |Q_T| \quad (4)$$

§4.4.1.2 A Heuristic Algorithm for Set Regrouping Problem

To simplify the problem, another constraint (referred to as "isolation constraint") is added on the model of the b-SR problem, which is shown in Equation (5):

$$S_{i,j} \cap S_{i,k} = \phi (\forall j \neq k; i = 1, \ldots, N_D) \quad (5)$$

The isolation constraint requires that there be no overlap between the subsets split from the same NFA active state combination.

§4.4.1.2.1 2-Set Regrouping Problem

The b-SR problem is first considered with b=2. Later more general situations, with b>2, are considered.

Let $v_i$ be the number of states in the i-th NFA active state combination. The number of different ways to split the combination (denoted as $F_i$) under the 2-SRG problem can be expressed as follows:

$$F_i = 2^{v_i - 1} \qquad (6)$$

Since there are $N_D$ different NFA active state combinations, the number of possibilities to split these state combinations is $$\prod_{i=1}^{N_D} F_i.$$

Since, the problem space is too large if every possible regrouping is considered, to design a practical algorithm, the problem space is reduced in a way to be explained as follows.

Given an NFA active state combination with v states, consider only two kinds of special regroupings:

(1) No regrouping at all (i.e., one subset is empty);
(2) Regroupings that divide the combination into two subsets whose sizes are 1 and v−1, respectively.

In this way, the value of $F_i$ can be reduced from that given in Equation (6), to $v_i+1$. The rationale behind the second special regrouping is as follows. After analyzing the NFA active state combinations of many rule sets, the present inventors observed that many combinations of NFA active states differ from each other in only one NFA state. For instance, the combinations {A,B,C,D}, {A,B,C,E}, {A,B,C,F}, and {A,B,C,G} differ from each other only in the last state. Splitting {A,B,C} out from these combinations yields five subsets—{A,B,C}, {D}, {E}, {F}, and {G}. It is very likely that the four single-element subsets are already used (or will be used) in other regroupings. Consequently, the four original combinations—{A,B,C,D}, {A,B,C,E}, {A,B,C,F}, and {A,B,C,G}—produce only one distinct subset {A,B,C}, assuming that the single element subsets are already used. This results in a high reusability of subsets.

Figure 5:
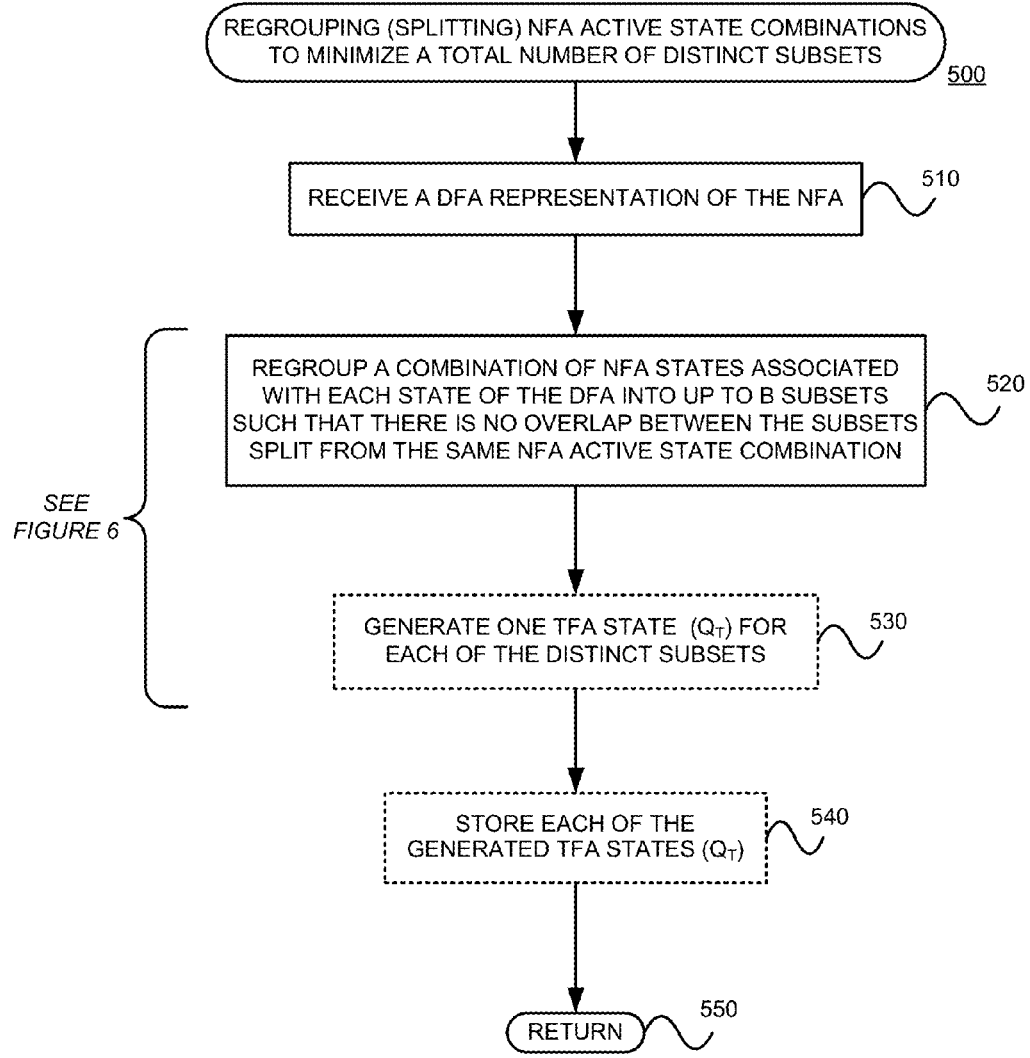
FIG. 5 is a flow diagram of an example method for regrouping (e.g., splitting) NFA active state combinations of a DFA to minimize a total number of distinct subsets.

FIG. 5 is a flow diagram of an example method 500 for regrouping (e.g., splitting) NFA active state combinations of a DFA to minimize a total number of distinct subsets. As shown, a DFA representation of the NFA is received (Block 510) and a combination of NFA states associated with each state of the DFA are regrouped into up to b subsets such that there is no overlap between the subsets split from the same NFA active state combination (Block 520), before the method 500 is left (Node 550). Still referring to FIG. 5, one TFA state ($Q_T$) may be generated for each of the distinct subsets (Block 530) and each of the generated TFA states ($Q_T$) may be stored (Block 540).

Referring back to blocks 520 and 530 of FIG. 5, FIG. 6 is a flow diagram of an example method 600 for regrouping (e.g., splitting) NFA active state combinations of a DFA into, at most, b distinct subsets, manner consistent with the present invention. The example method 600 generates a tripartite graph with a first set of vertices including state combination vertices corresponding to the states of the DFA, a second set of vertices including regroup decision vertices each of which include up to b sets of NFA states resulting from regrouping the sets of NFA states in various DFA states, and a third set of vertices including subset vertices, wherein each regroup decision vertex is connected with both (i) an associated state combination vertex and (ii) any subset vertices that can be obtained from the regroup decision. (Block 610) A finite set of TFA states is then initialized. (Block 620) A subset vertex with the largest degree from among those subset vertices whose size is greater than one and whose degree is greater than one is selected, but if none of the subset vertices has a size greater than one and a degree greater than one, then the subset vertex with the largest degree is selected. (Block 630) The set of NFA states corresponding to the selected subset vertex is then added, as a single member, to the set of TFA states. (Block 640) Any regroup decision vertices connected with the selected subset vertex is determined and up to b sets of NFA states for each of selected regroup decision vertices are stored (as entries) in a set regroup table. (Block 650) Any state combination vertices connected from the selected regroup decision vertices are removed from the tripartite graph; then any regroup decision vertices previously connected with the just removed state combination vertices are removed from the tripartite graph; and finally any subset vertices with a degree of zero are then removed from the tripartite graph. (Block 660). If all subset vertices are removed or selected, the method 600 is left. (Node 680) Otherwise, the method 600 branches back to block 630.

As can be appreciated from the methods 500 and 600 of FIGS. 5 and 6 respectively, example embodiments consistent with the present invention solve the problem of regrouping NFA active state combinations to minimize the total number of distinct subsets by regrouping the NFA active states such that there is no overlap between the subsets split from the same NFA active state combination.

Figure 7A:
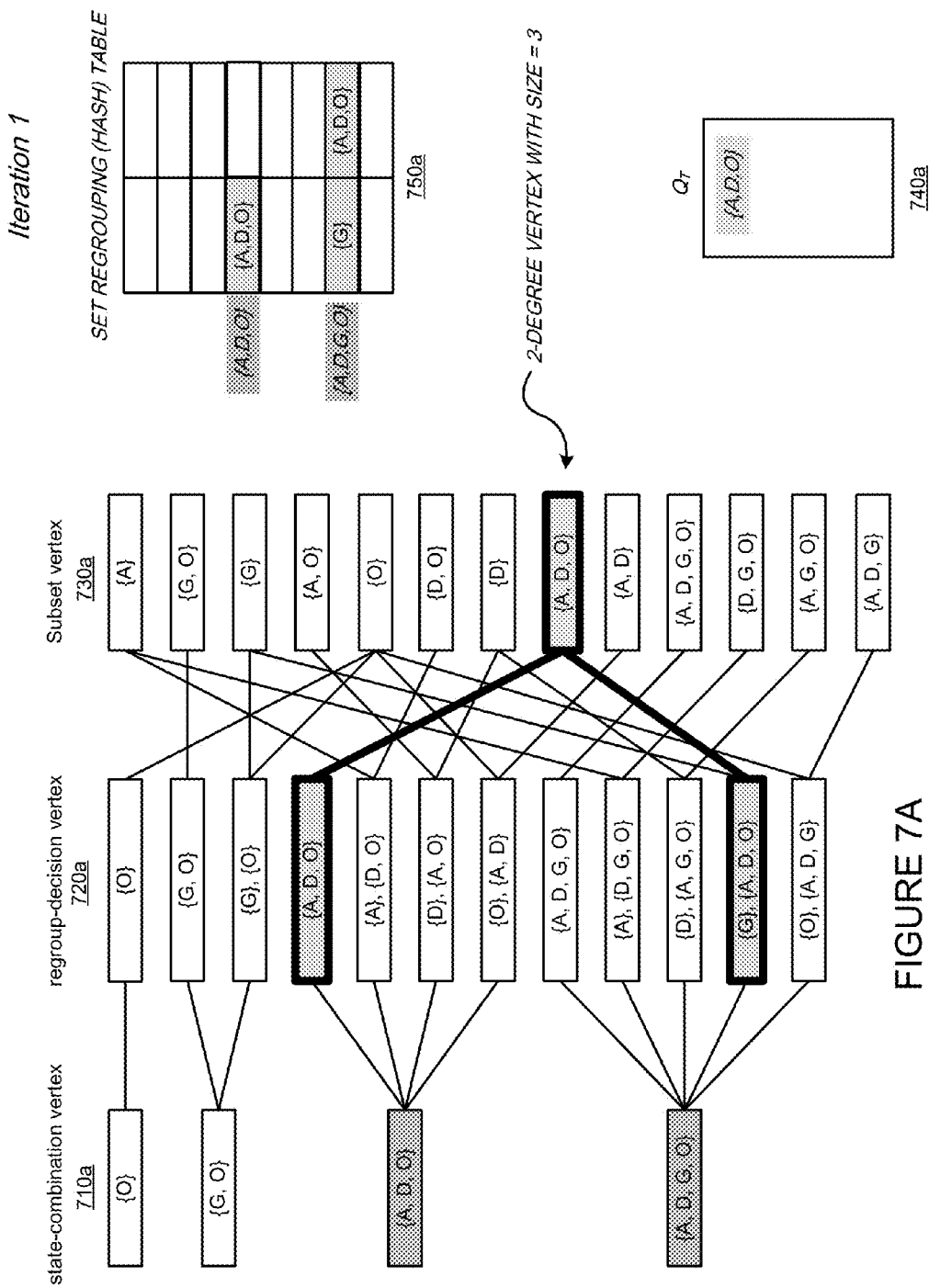
Figure 7C:
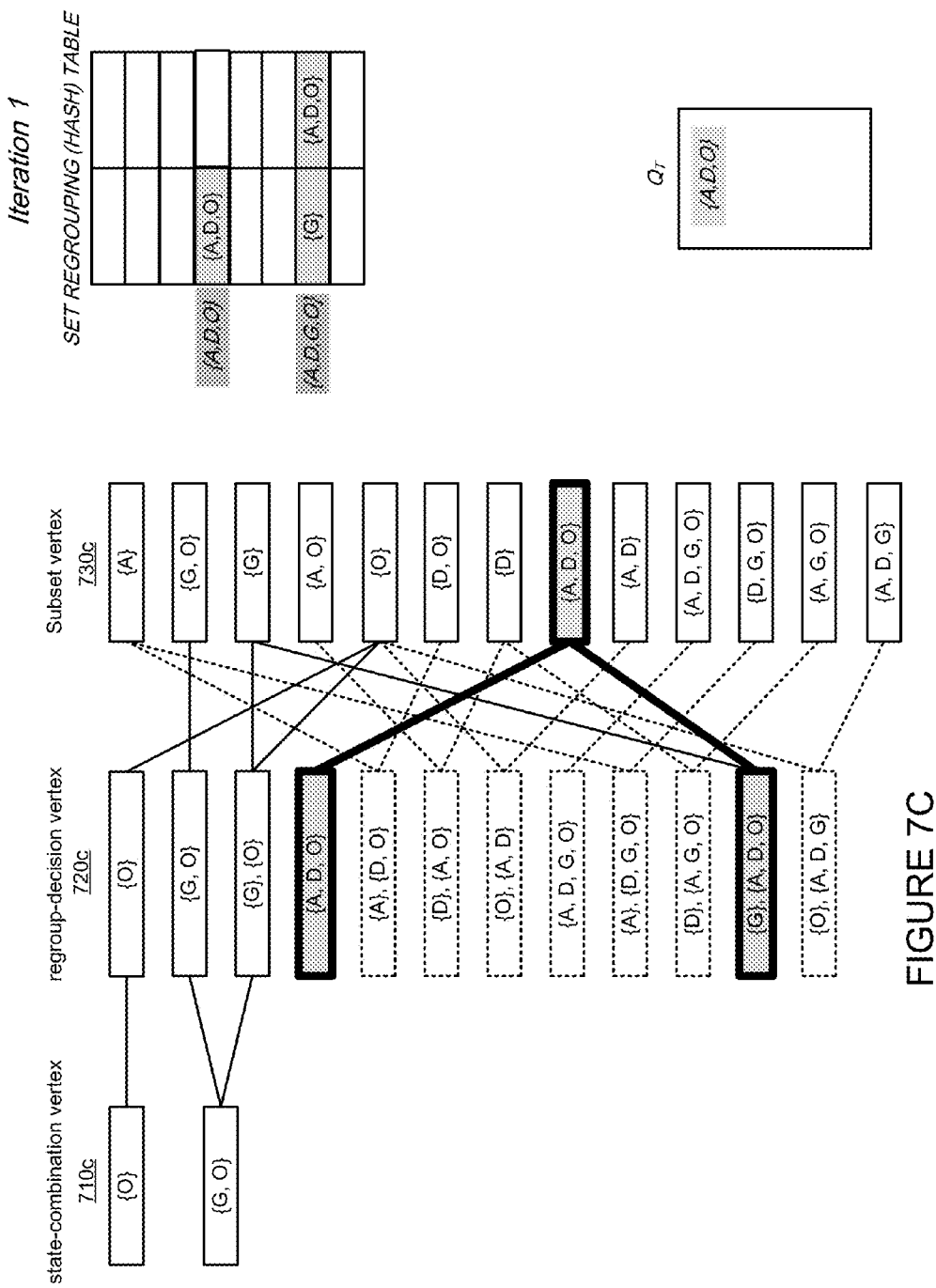
Figure 7D:
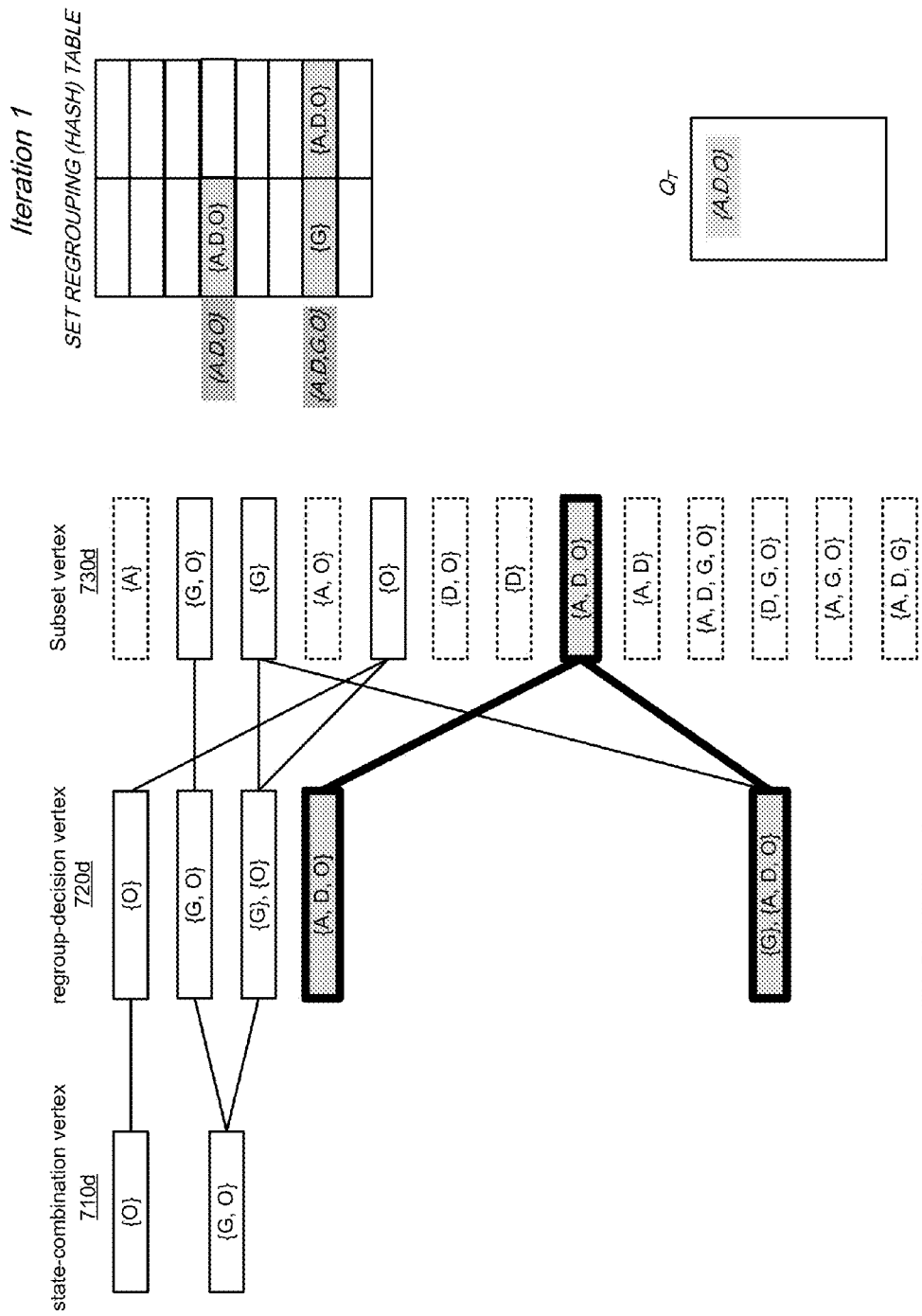
Figure 7E:
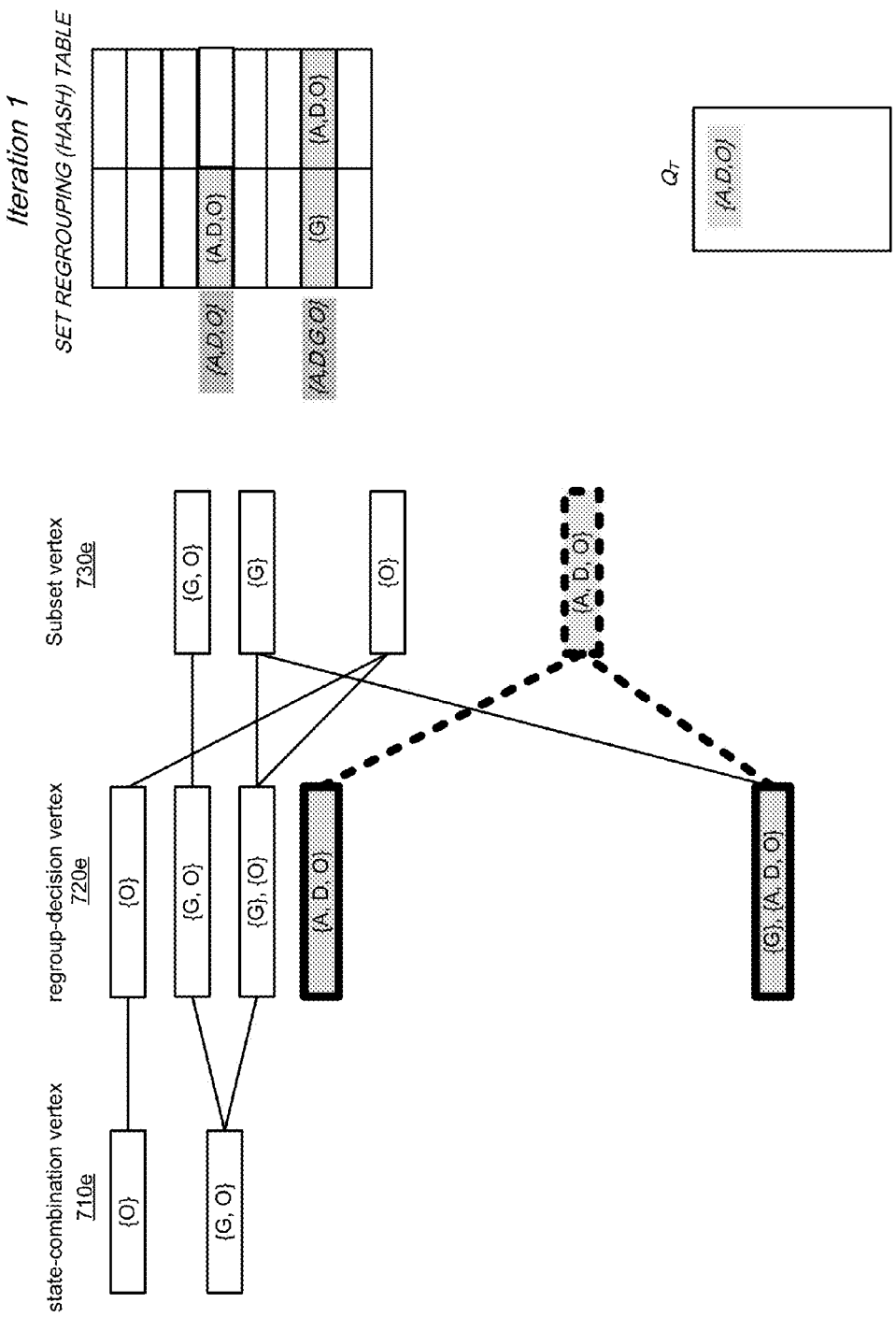

FIGS. 7A-7J provide an example illustrating operations of an example method consistent with FIG. 6. Referring to FIG. 7A, the main data structure used in the foregoing method 600 of FIG. 6 is a tripartite graph. Each vertex in the left partition 710a (called a "state-combination" vertex) corresponds to an NFA active state combination. Each vertex in the middle partition 720a (called a "regroup-decision" vertex) denotes a valid regrouping decision for one of the combinations. Each vertex in the right partition 730a (called a "subset" vertex) corresponds to a unique subset obtained via the regroupings in the middle partition. Each regroup-decision vertex is connected with its associated state-combination vertex, as well as the subset vertices that can be obtained from the regroup decision. Recall from FIG. 6 that the example method 600 performs multiple iterations to find a set of subsets ($Q_T$) which satisfies the constraints in the 2-set regrouping problem. (Recall, e.g., condition 670 of FIG. 6.) Initially, $Q_T$ 740a is empty. (Recall, e.g., block 620 of FIG. 6.)

In each iteration, the method 600 starts with the subset vertices in the right partition 730a, and selects the largest-degree subset (the number of connected edges) among the subsets whose sizes and degrees are both larger than 1. (See subset vertex {A, D, O} in FIG. 7a and block 630 of FIG. 6.) (Subsets with sizes larger than 1 are considered first because the second special split tends to generate many large-degree single-element subset candidates (such as {O}). Selecting these subsets in the very beginning will cause many unwanted splits.) If no such subset is found, the largest-degree subset from among all the subsets is selected. The selected subset will be put into $Q_T$. (See block 630 of FIGS. 6 and 740a of FIG. 7A.) The regroup-decision vertices 720a ({A,D,O} and {G}, {A,D,O}) connected with the selected subset vertices 730a ({A,D,O}) will also be selected and stored in the SRT table. (See block 650 of FIGS. 6 and 750a of FIG. 7A.) Then, those vertices that will not be used are removed from the tripartite graph. (Recall, e.g., block 660 of FIG. 6.) More specifically, (1) the state-combination vertices 710b (including their edges) connected with the selected regroup-decision vertices 720*a/b* are removed (See, e.g., the dashed boxes and lines in FIG. 7B.); (2) the regroup-decision vertices 720*c*, except for the selected regroup-decision vertices, (including their left and right edges) previously connected with the just-removed state-combination vertices are removed (See, e.g., the dashed boxes and lines in FIG. 7C.); (3) the subset vertices 730*d* whose degrees are zero are removed (See, e.g., the dashed boxes in FIG. 7D.); and (4) the just selected subset vertex 730*e* are removed (See, e.g., the dashed box of FIG. 7E). Now one iteration is completed. The iteration repeats until all subset vertices are removed or selected. (Recall, e.g., 670 of FIG. 6.)

Figure 7F:
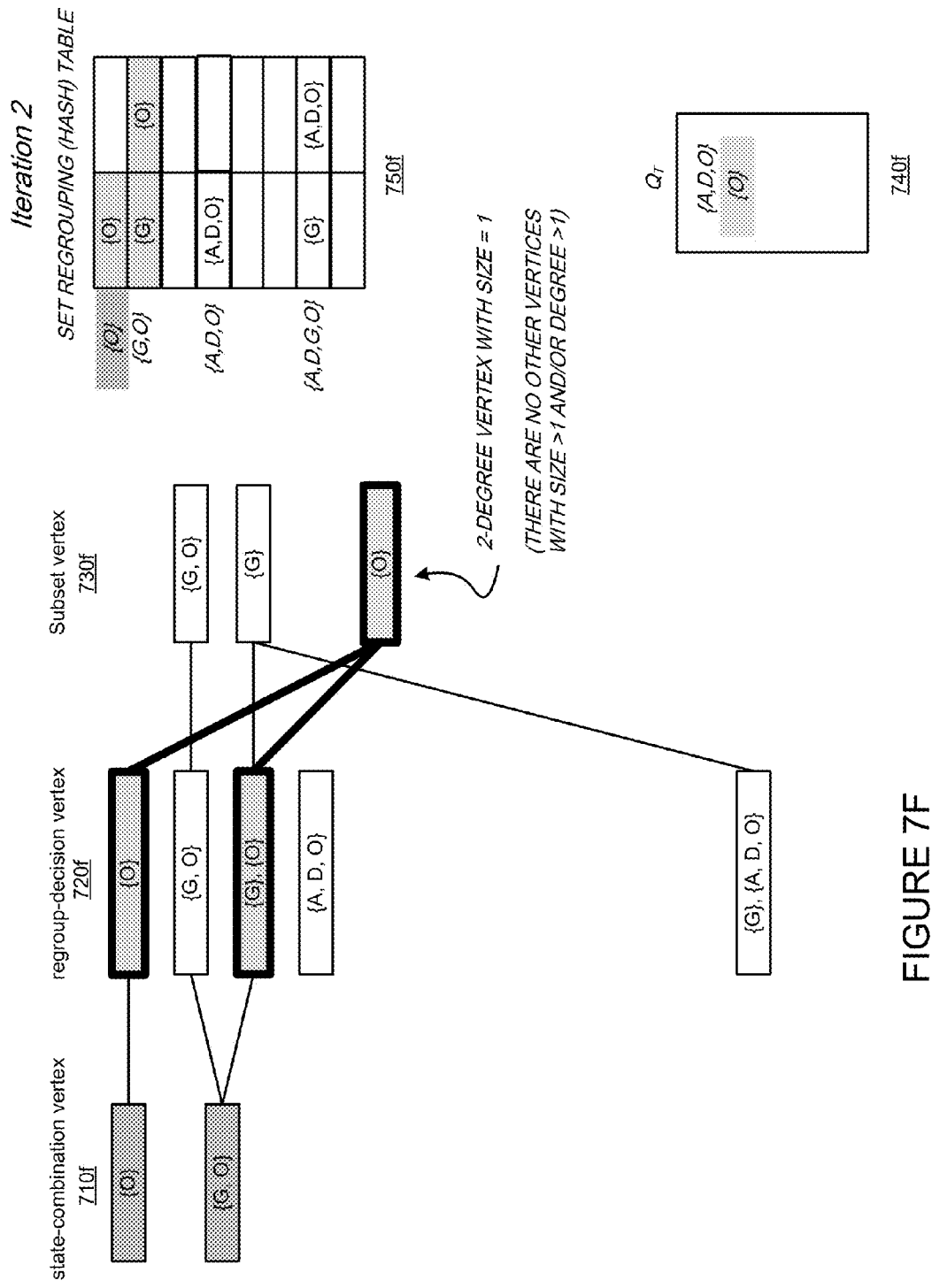
Figure 7G:
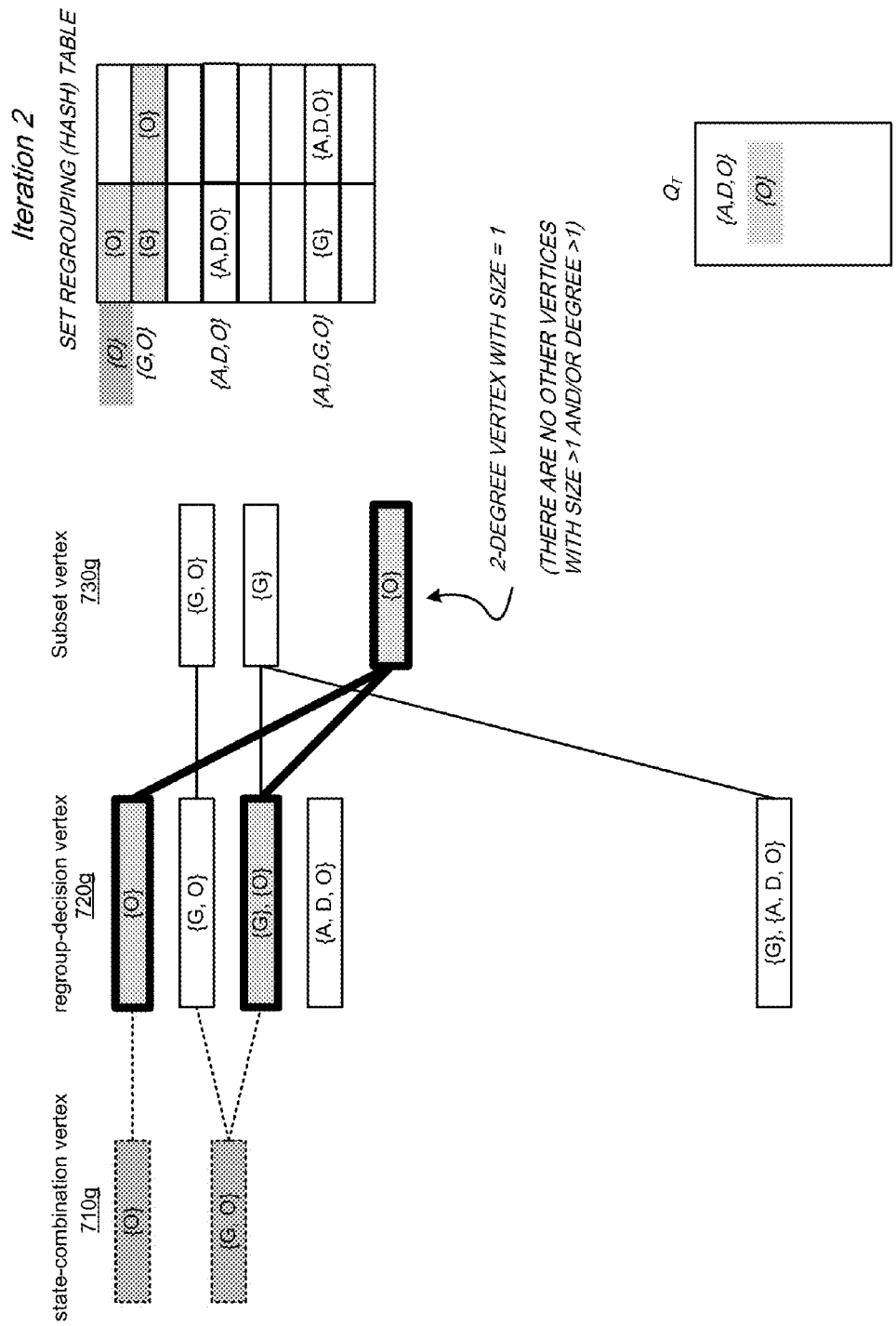
Figure 7H:
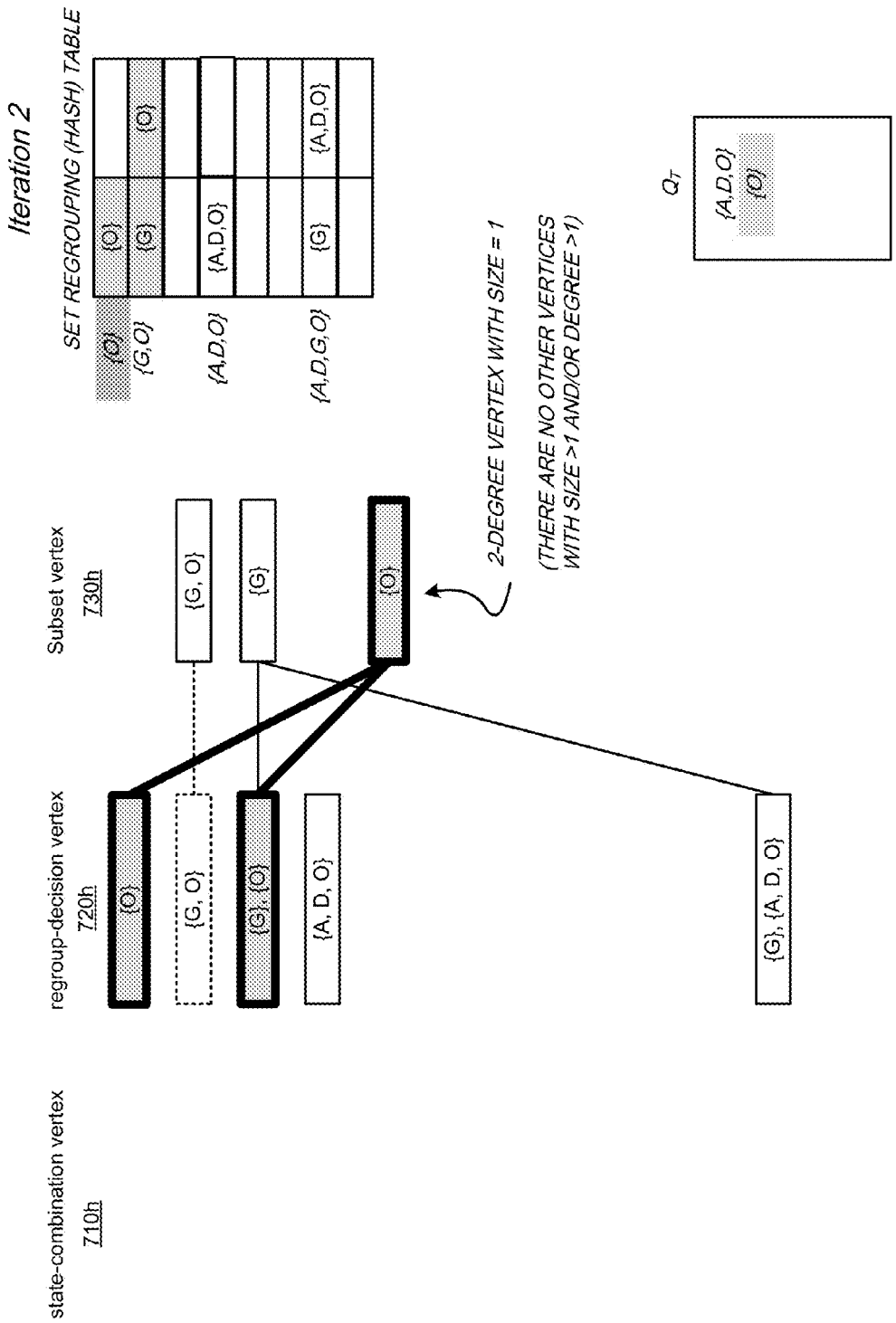
Figure 7I:
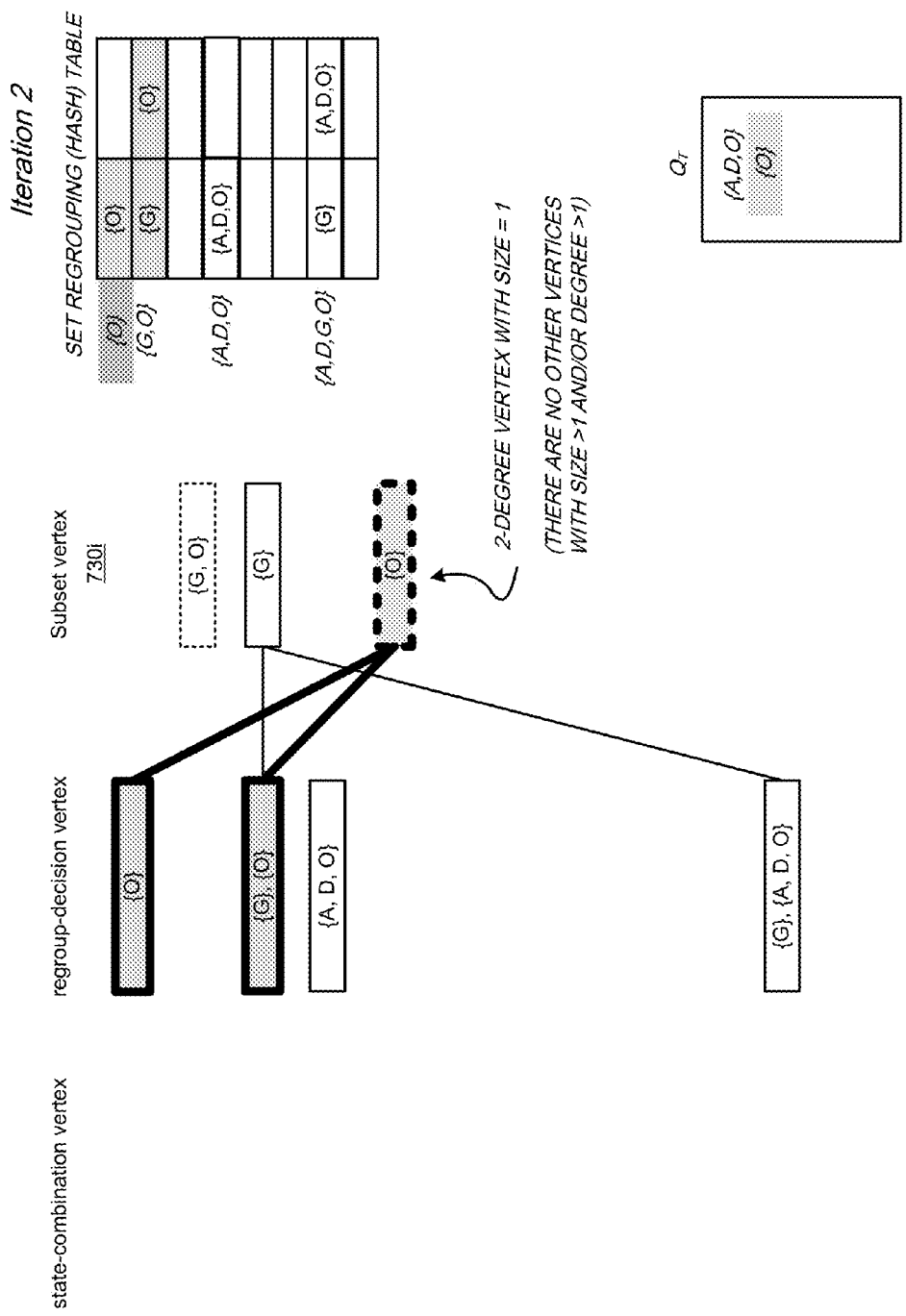
Figure 7J:
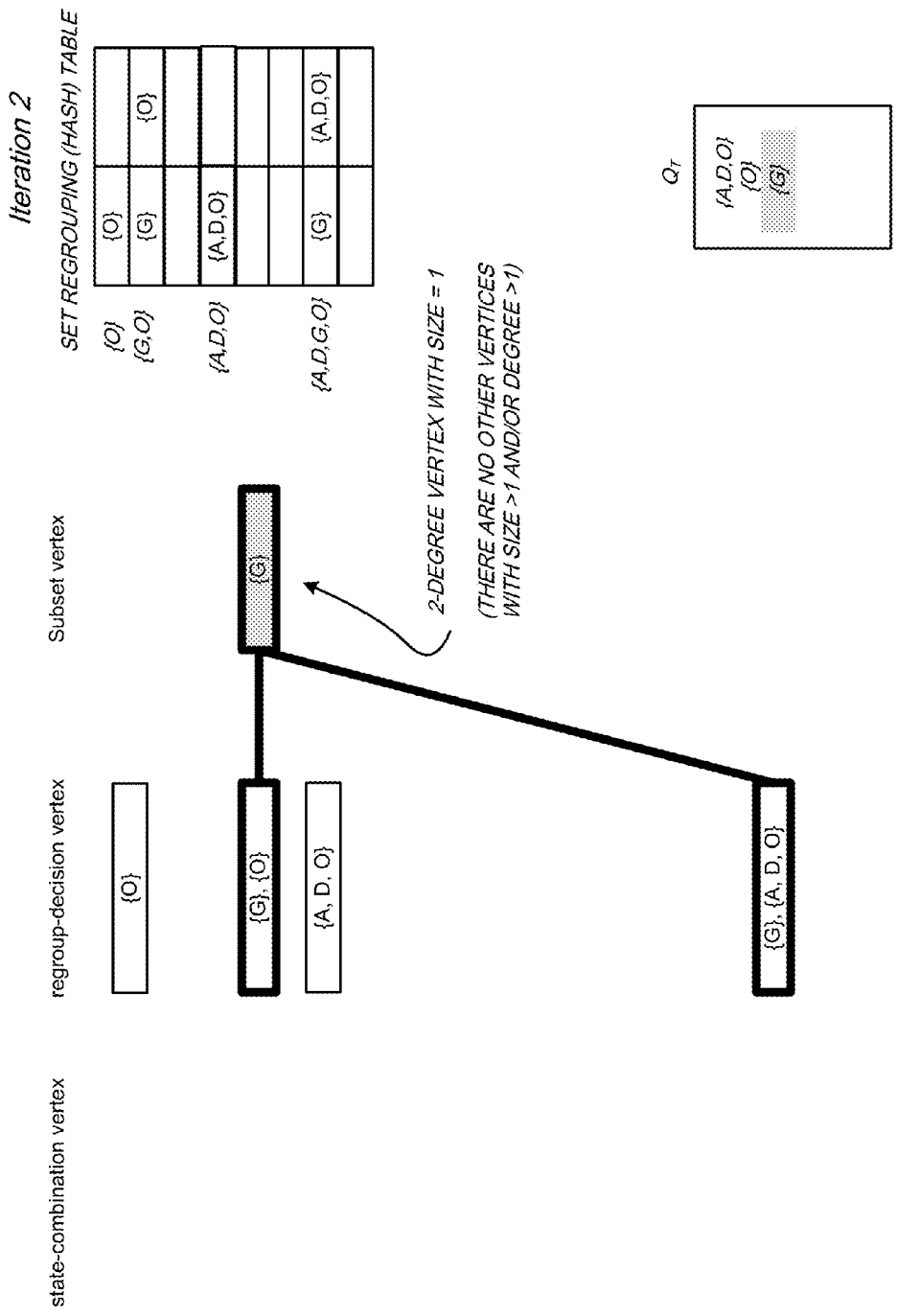

Referring to FIG. 7F, at the start of the second iteration, the subset vertex 730*f* {O} is selected because it is a second degree vertex with a size of 1, and there are no other vertices with size>1 and/or degree>1. (Recall, e.g., block 630 of FIG. 6.) The subset vertex {O} is selected and added to the set $Q_T$ 740*f*. (Recall, e.g., block 640 of FIG. 6.) The regroup-decision vertices 720*f* ({O} and {G}, {O}) connected with the selected subset vertices 730*a* ({O}) will be selected and stored in the SRT table. (See block 650 of FIGS. 6 and 750*f* of FIG. 7F.) Then, those vertices that will not be used are removed from the tripartite graph. (Recall, e.g., block 660 of FIG. 6.) More specifically, (1) the state-combination vertices 710*g* (including their edges) connected with the selected regroup-decision vertices 720*f/g* are removed (See, e.g., the dashed boxes and lines in FIG. 7*g*.); (2) then, the regroup-decision vertices 720*h*, except for the selected regroup-decision vertices, (including their left and right edges) previously connected with the just-removed state-combination vertices are removed (See, e.g., the dashed box and line in FIG. 7H.); (3) next, the subset vertex 730*i* whose degree is zero is removed (See, e.g., the dashed box in FIG. 7I.); and (4) finally, the just selected subset vertex 730*i* is removed (See, e.g., the dashed box of FIG. 7I). Now the second iteration is completed. (See FIG. 7J.) The iteration repeats until all subset vertices are removed or selected. (Recall, e.g., 670 of FIG. 6.)

In the third iteration, the subset vertex {G} is selected. After processing, four NFA active combinations are regrouped (e.g., split) into three TFA states.

§4.4.1.2.2 B-Set Regrouping Problem

The foregoing methods for solving the 2-set regrouping problem can be expanded easily to solve a b-set regrouping problem if b is equal to the power of 2. More specifically, this may be done by running the 2-set regrouping method recursively, for $\log_2 b$ times, with each iteration using the output of the previous iteration as its input.

Further, the foregoing methods for solving the 2-set regrouping problem can be expanded to solve a b-set regrouping problem if b is an arbitrary integer. More specifically, this may be done by running the 2-set regrouping method b−1 times, each time using the output of the previous run as its input.

§4.4.2 State Encoding

Storage of state labels is a challenging aspect of the TFA implementation because different state labels include different numbers of NFA state IDs. One simple storage scheme is to implement each state label as an array, including all associated NFA state IDs. However, this simple scheme suffers from two problems: (1) high storage cost; and (2) TFA operation overhead.

As will be described in §4.6 below, the operations of a TFA in one time slot include the following. After examining outgoing transitions of current active states, the TFA returns up to b state labels, each containing a set of NFA state IDs. A union operation is required on these ID sets, and the result is used, together with the SRT table, to search for one or more active states for the next time slot.

To achieve a constant lookup performance, the SRT table is implemented as a perfect hash table (as proposed in, e.g., R. Pagh and F. F. Rodler, "Cuckoo Hashing," *Journal of Algorithms*, p. 2004 (2001) (incorporated herein by reference), and F. J. Enbody and H. C. Du, "Dynamic Hashing Schemes," *ACM Computing Surveys*, Vol. 20, pp. 85-113 (1988) (incorporated herein by reference).) in some example embodiments consistent with the present invention. However, such a perfect hashing implementation requires the set union operation to return a deterministic and unique representation (e.g., a hash key) for each valid combination of NFA active states. If each state label were implemented as an array, two complicated operations would be required after the set union operation: (1) redundancy elimination; and (2) sorting. Regarding redundancy elimination, consider two state labels {D,O} and {G,O}. To get their union, the redundant state "O" must be identified and removed. Regarding sorting, the unions of different state labels could result in different representations for the same NFA active state combination (for example, {O,D,G} and {D,G,O} are logically the same). Therefore, the state IDs in the result set should be sorted before performing the table lookup. To overcome these problems, efficient state encoding methods are described in §4.4.2.1 below.

§4.4.2.1 State Encoding Problem

The present inventors recognized that it is desired to assign a bit vector to each NFA state (as its ID) so that the union operation on multiple NFA states can be replaced by a simple bitwise OR operation. Consequently, the redundancy elimination and sorting operations discussed above are no longer needed to get a deterministic representation for each NFA active state combination. Furthermore, with such state encoding, each state label in the TFA structure no longer needs to store the IDs of all associated NFA states. (Recall FIG. 2(*a*).) Instead, only the result of the bitwise OR operation on these NFA state IDs needs to be stored. Consequently, all state labels can have the same length in bits. However, to operate the TFA correctly, only one constraint needs to be satisfied when encoding the NFA states. Specifically, the bit vector associated with each valid combination of NFA active states (i.e., each DFA state) must be unique. This constraint is referred to as the "uniqueness constraint." It is also desirable to minimize the number of bits encoding the NFA states. Therefore the state encoding procedure can be formally described as finding a way to assign each NFA state a bit vector, such that: (1) the (DFA state) uniqueness constraint is satisfied; and (2) the number of bits used in the bit vector is minimized. This state encoding problem is NP-hard (i.e., it cannot be solved in linear or polynomial time, but requires exponential time).

§4.4.2.2 State Encoding Algorithm

The problem of representing NFA states efficiently, in a way permits efficient union operations is solved using an independent graph that represents NFA states as nodes and that represents whether the NFA states can not be simultaneously active as edges, dividing the nodes of the graph into a small number of maximal cliques, and encoding each of the nodes using the number and size of the maximal cliques.

FIG. 8 is a flow diagram of an example method 800 for representing NFA states efficiently, in a way that permits efficient union operations. As shown in FIG. 8, an independent graph is generated in which the NFA states are represented as nodes and whether the NFA states can not be simultaneously active is represented as edges. (Block 810) The nodes of the graph are divided into a small number of maximal cliques. (Block 820). Finally, each of the nodes is encoded using a number and size of the maximal cliques (Block 830) before the method 800 is left (Node 840).

Referring back to block 830 of FIG. 8, the act of encoding each of the nodes using the number and size of the maximal cliques may encode each state of the NFA as a bit vector. FIG. 9 is a flow diagram of an example method 900 for encoding nodes of an independent graph representing NFA states using a number and size of maximal cliques. Referring to FIG. 9, the maximal cliques are numbered sequentially, starting at one. (Block 910) Then, nodes in the first maximal clique are encoded contiguously using bit position 1 to bit position $\lceil \log_2 (m_1+1) \rceil$, with other bit positions being set to "0", wherein $m_1$ is the size of maximal clique$_1$. (Block 920) Finally, for each maximal clique following the first maximal clique, the nodes in the j$^{th}$ maximal clique are encoded continuously using bit position $$\sum_{j=1}^{k-1} \lceil \log_2(m_j + 1) \rceil + 1$$

to bit position $$\sum_{j=1}^{k} \lceil \log_2(m_j + 1) \rceil,$$

with other bit positions being set to "0", wherein $m_j$ is the size of the j$^{th}$ maximal click (Block 930), before the method 900 is left (Node 940).

FIGS. 10 and 11 provide an example illustrating operation of example methods consistent with FIGS. 8 and 9. Referring back to block 810 of FIG. 8, as well as FIG. 10, given an NFA, an independent graph 1000 is constructed in which each node corresponds to one NFA state. Two nodes in the independent graph are connected by an edge, if and only if their associated NFA states are never active together (i.e., never together in one NFA active state combination). The independent graph 1000 of FIG. 10 corresponds to the NFA in FIG. 2a. Referring back to block 820 of FIG. 8, as well as FIG. 10, nodes of the independent graph are divided into a small number of maximal cliques 1010a-1010d. Four maximal cliques 1010a-1010d are shown by the three dashed rectangles and the node O in FIG. 10. Referring back to 910 of FIG. 9, these cliques are denoted by $C_j$ (j=1, . . . , n), where n is the number of cliques. In the case of FIG. 10, the four cliques 1010a-1010d are denoted by $C_1$-$C_4$, respectively. Let be the size of clique $C_j$.

The state encoding method 900 of FIG. 9 uses $$\sum_{j=1}^{n} \lceil \log_2(m_j + 1) \rceil + 1$$

bits, in total, for the encoding. Referring back to 920 of FIG. 9, as well as FIGS. 10 and 11, nodes A, B and C in clique $C_1$ 1010a are encoded contiguously using bit position 1 to bit position $\lceil \log_2 (m_1+1) \rceil$ (referred to as EQ (7) in FIG. 9), with other bit positions being set to "0", wherein $m_1$ is the size of maximal clique$_1$. The results of encoding these nodes are shown in 1110a of FIG. 11. Referring back to block 930 of FIG. 9, as well as FIGS. 10 and 11, nodes in clique $C_k$ (k>1) (that is, for each maximal clique following the first maximal clique, the nodes in the j$^{th}$ maximal clique) are encoded continuously using bit position $$\sum_{j=1}^{k-1} \lceil \log_2(m_j + 1) \rceil + 1$$

(referred to as EQ (8) in FIG. 9) to bit position $$\sum_{j=1}^{k} \lceil \log_2(m_j + 1) \rceil$$

(referred to as EQ (9) in FIG. 9), with other bit positions being set to "0", wherein $m_j$ is the size of the j$^{th}$ maximal clique. The results of encoding the nodes in cliques $C_2$ 1010b, $C_3$ 1010c, and $C_4$ 1010d of FIG. 10 are depicted in 1110b, 1110c, and 1110d, respectively, of FIG. 11. Thus, in the independent graph 1000 of FIG. 10, from which we can get four cliques. Notice that the first clique $C_1$ 1010a includes nodes "A", "B", and "C", which are encoded consecutively using the first two bit positions as shown in 1110a of FIG. 11.

One skilled in the art will appreciate that with the foregoing state encoding methods, each valid combination of NFA active states has a unique bit vector. This is because the NFA states in each valid combination are always from different cliques and use different bit positions.

§4.5 Resulting TFA Data Structures

Recall from §4.4 above that given the NFA of FIG. 1A, FIG. 2A shows a 2-TFA structure (with 18 isolated states) 210 and FIG. 2B shows an SRT table. Referring first to FIG. 2A, the 18 states of the 2-TFA structure 210 include O, OA, OB, OC, OD, OE, OF, OG, OH, OI, AD, AE, AF, BD, BE, BF, CD, and CE. "Match" states in the 2TFA, which correspond to terminal NFA states C, F, and I in FIG. 1A, are depicted by a double circle and include OC, OF, OI, AF, BF, CD and CE. Referring back to FIG. 2B, each entry of the SRT table 220 corresponds to one combination of NFA active states (i.e., a DFA state) recording how to regroup (e.g., split) the combination into multiple TFA states (the memory addresses of the TFA states are stored).

§4.6 Using the TFA Data Structures for Regular Expression Matching

FIG. 12, which includes FIGS. 12A and 12B, is a flow diagram of an example method 1200 for using a TFA for regular expression matching (i.e., for determining whether an arbitrary sequence of input symbols matches a set of regular expressions represented by an NFA) in a manner consistent with the present invention. The TFA emulates, with, at most, b concurrent active states, the NFA (which has a finite set of states ($Q_N$), a finite set of input symbols ($\Sigma$) and a transition function covering each state and input symbol). The TFA includes (1) a plurality of TFA states ($Q_T$), up to b TFA states representing any NFA active state combination, each of the plurality of states having at least one associated state label covering the finite set of input symbols, and (2) a table (SRT) including a plurality of entries, each of the plurality of entries (i) including up to pointers to up to b TFA states, the union of the up to b TFA states corresponding to one of the NFA active state combination, and (ii) being indexed by an NFA active state combination corresponding to a state of a DFA representation of the NFA. More specifically, referring to FIG. 12A, the method 1200 defines each of up to b of the plurality of TFA states as an initial state. (Block 1205) A next symbol of the arbitrary sequence of input symbols is received. (Block 1210) A state label associated with each of the up to b initial TFA states is determined using the next symbol. (Block 1215) One of the plurality of entries of the table is determined using a union of the up to b state labels. (Block 1220) Each of the up to b initial TFA states is deactivated. (Block 1225) A next set of up to b TFA states is then activated using pointers stored in the entry. (Block 1230) It is then determined if the next set of up to b active TFA states includes a match TFA state. (Block 1235) If it was determined that the next set of up to b active TFA states include a match TFA state, then a match corresponding the match TFA state(s) is indicated (decision 1240 and block 1250). Regardless of whether or not there was a match in decision 1240, if any unprocessed symbols of the arbitrary sequence of input symbols remain, the method 1200 continues, via node A 1245, to block 1255. (Decision 1251) If, on the other hand, there are no unprocessed symbols, then the method 1200 is left (Decision 1251 and Node 1299).

Referring to both FIGS. 12A and 12B, if it was determined that one or more unprocessed symbols of the arbitrary sequence of input symbols remain, a next symbol of the arbitrary sequence of input symbols is received. (Decision 1251), Node 1245 and Block 1255) Still referring to FIG. 12B, the method 1200 then uses the next symbol to determine a state label associated with each of the active TFA states. (Block 1260) A union of the up to b state labels is then used to determine a next one of the plurality of entries of the table. (Block 1265) The active TFA states are deactivated. (Block 1270) A next set of up to b TFA states are identified and activated using pointers stored in the entry. (Block 1275) The method 1200 then determines if the next set of up to b active TFA states include at least one match TFA state. (Block 1280) If it was determined that the next set of up to b active TFA states include at least one match TFA state, then the method 1200 indicates a match corresponding the match TFA state(s). (Decision 1285 and Block 1290) Regardless of whether or not there was a match in decision 1285, if any unprocessed symbols of the arbitrary sequence of input symbols remain, the method 1200 continues via block 1255. (Decision 1295) If, on the other hand, there are no unprocessed symbols, then the method 1200 is left (Node 1299).

Referring back to blocks 1220 and 1265, in some example embodiments consistent with the present invention, determining a union of the state labels is performed using a bitwise OR operation of bit vector representations of the NFA state labels. In at least some such example embodiments, all of the bit vectors have the same length. (Recall §4.2.2 above.)

The following pseudo code describes the operations of a b-TFA in each time slot:

| Pseudo Code 1: Operations of B-TFA in Each Time Slot | |
|---|---|
| 1: Input: | |
| 2:    s (s ≤ b); | no. of active states in current time slot |
| 3:    A[j](j = 1, . . . , s); | current active states |
| 4:    c; | input character |
| 5: Output: | |
| 6:    s' (s' ≤ b); | no. of active states in next time slot |
| 7:    A' [j] (j = 1, ..., s'); | active states in next time slot |
| 8: | |
| 9:   T = NULL; | |
| 10:   for (j = 1, ..., s) do | |
| 11:      T = TU state label on state A[j] labeled with c; | |
| 12:   end for | |
| 13:   use T to access SRGT table, returning s' and A' [j] (j =1, ..., s') | |

An example illustrating operations of the example method 1400 and pseudo code is now provided. Consider the TFA in FIGS. 2A and 2B. Assume that an input string "adegf" is to be processed. The initial TFA state is "O". (Recall block 1205 of FIG. 12.) After reading in the first character "a" (Recall block 1210 of FIG. 12.), the initial active state of the TFA "O" returns a state label {A,O}. (See FIGS. 2A and 1215 of FIG. 12.) The returned state label {A,O} is then used to query the SRT table. (See FIGS. 2B and 1220 of FIG. 12.) In response, the memory address of the next up to b active TFA states is returned. (See entry &OA and NULL in FIGS. 2B and 1220 of FIG. 12.) The up to b TFA states ("OA") is activated and the initially active state ("O") is deactivated. (Recall 1225 and 1230 of FIG. 12.) Since the active state ("OA") is not a "match" state (Notice no double circle for this state in FIGS. 1C and 2A.), a next symbol is received. (Recall 1240, 1245 and 1255 of FIG. 12.)

In this example, the next character (of "adegf") is "d". Given the active state "OA", the next character "d" will return state label {A,D,O}. (Not shown in FIG. 2A.) (Recall, 1260 of FIG. 12.) The returned state label {A,D,O} is then used to query the SRT table. (See FIGS. 2B and 1265 of FIG. 12.) In response, the memory address of the next up to b active TFA states is returned. Referring to FIG. 2B, the table entry corresponding to {A,D,O} provides two active states ("&O" and "&AD"). (Recall 1265 of FIG. 12.) The up to b TFA states ("O" and "AD") are activated and the previously active state ("OA") is deactivated. (Recall 1270 and 1275 of FIG. 12.) Since neither of the active states ("O" and "AD") is not a "match" state (Notice no double circle for either of these states in FIGS. 1C and 2A.), a next symbol is received. (Recall 1280, 1285 and 1295 of FIG. 12.)

The third input character (of "adegf") "e" is received. (Recall 1255 of FIG. 12.) Active state "O" returns state label {O} (not shown in FIG. 2A) and active state "AD" returns state label {A,E} (also not shown in FIG. 2A). (Recall 1260 of FIG. 12.) The union of the two labels (i.e., {A,E,O}) is then used to query the SRT table to find the up to b new active states (&OA and &AE). (See FIGS. 2B and 1265 of FIG. 12.) These states are made active and the previously active states are deactivated. (Recall 1270 and 1275 of FIG. 12.)

The foregoing procedure is repeated every time slot until the entire input string is scanned (Recall 1251 and 1295 of FIG. 12.).

It should be noted that the scheme of TFA is different from the DFA grouping scheme proposed the reference F. Yu, Z. Chen, Y. Diao, T. V. Lakshman, and R. H. Katz, "Fast and Memory-Efficient Regular Expression Matching for Deep Packet Inspection," *Proc. of ACM/IEEE ANCS* (2006) (incorporated herein by reference). The previously proposed DFA grouping scheme cannot be applied, or performs badly, under certain circumstances, such as situations in which the rule set has only one regular expression, or has multiple regular expressions but one of them is extremely complex. Consider the NFA and DFA shown in FIGS. 13A and 13B, respectively, which represent a single regular expression .*ab.{3}cd used in the reference M. Becchi and P. Crowley, "A Hybrid Finite Automaton for Practical Deep Packet Inspection," *Proc. of ACM CoNEXT* (2007) (incorporated herein by reference). Apparently, the previously proposed DFA grouping scheme cannot be used in this single-rule case. However, the TFA can still be adopted to reduce the memory cost. Consider the 2-TFA with only nine (9) states shown in FIG. 13C. It is always possible to use (at most) two 2-TFA states to exactly cover a valid combination of NFA active states. This example also shows the efficiency of TFAs when handling regular expressions with repetitions (e.g., counting).

§4.7 Example Apparatus

FIG. 14 is a block diagram of a machine 1400 that may perform one or more of the operations and store various information described above. The machine 1400 includes one or more processors 1410, one or more input/output interface units 1430, one or more storage devices 1420, and one or more system buses and/or networks 1440 for facilitating the communication of information among the coupled elements. One or more input devices 1432 and one or more output devices 1434 may be coupled with the one or more input/output interfaces 1430.

The one or more processors 1410 may execute machine-executable instructions (e.g., C or C++ running on the Linux operating system widely available from a number of vendors such as Red Hat, Inc. of Durham, N.C., the Windows operating system available from Microsoft, etc.) to effect one or more aspects of the present invention. At least a portion of the machine executable instructions may be stored (temporarily or more permanently) on the one or more storage devices 1420 and/or may be received from an external source via one or more input interface units 1430. Alternatively, or in addition, the one or more processors may be implemented as integrated circuits, such as application specific integrated circuits ("ASICs"), and/or field programmable gate arrays ("FPGAs"). Indeed, the machine 1400 itself may be implemented as one or more ASICs and/or one or more FPGAs.

In one embodiment, the machine 1400 may be one or more conventional personal computers. In this case, the processing units 1410 may be one or more microprocessors. The bus 1440 may include a system bus. The storage devices 1420 may include system memory, such as read only memory (ROM) and/or random access memory (RAM). The storage devices 1420 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 1432, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 1410 through an appropriate interface 1430 coupled to the system bus 1440. The output devices 1434 may include a monitor or other type of display device, which may also be connected to the system bus 1440 via an appropriate interface. In addition to (or instead of) the monitor, the personal computer may include other (peripheral) output devices (not shown), such as speakers and printers for example.

§4.8 Performance Evaluation
§4.8.1 Storage of SRT Table

The storage of the SRT table is a fixed expense for a TFA. Consider that (1) the number of entries in the SRT table is equal to the DFA state number, and (2) each entry in the SRT table stores the addresses of b states. The SRT table for a b-TFA requires b/256 times the memory required by the corresponding DFA. Normally, a practical TFA takes b between 2 and 4, so the storage cost of the SRT table is about 0.78%~1.5% of the DFA. Perfect hashing implementation of the SRT table provides O(1) run-time performance but requires extra entries to facilitate the table construction. Cuckoo hashing (See, e.g., R. Pagh and F. F. Rodler, "Cuckoo Hashing," *Journal of Algorithms*, p. 2004 (2001) (incorporated herein by reference).) may be used to build the SRT table. In some experiments, an SRT table with millions of entries can be constructed with a load factor of 0.7 in 5 minutes. The storage cost of the SRT table including the extra entries for perfect hashing implementation is about 1.11%~2.14% of that required by a DFA.

§4.8.2 Storage of TFA Structure

The memory cost of a TFA structure depends on two factors: (1) TFA state number; and (2) the number of bits used in state encoding. With only two active states (i.e., b=2), a TFA can significantly reduce the number of states required by a DFA. The reduction rates are even higher when three active states are used. Allowing more active states leads to an even higher reduction.

§4.8.3 Memory Bandwidth Requirement

The memory bandwidth requirement (or the run-time speed) of an automaton can be expressed by the number of states which are activated during the processing of a character. Advantageously, a TFA can have the number of active states strictly bounded by the bound factor b. Consequently, it has a deterministic matching speed independent of the regular expression rule sets and traffic patterns.

§4.9 Conclusions

The described TFA has a clear and tunable bound on the number of concurrent active states (more than one) independent of the number and patterns of regular expressions. The described TFA is a general finite automaton model, which becomes a DFA when the bound factor b is set to 1 and NFA when the bound factor b is set to infinite. In addition, a TFA can be equivalently constructed from any NFAs and therefore supports all regular expressions. A set regrouping method was described to approximately solve the otherwise NP-hard problem. A state encoding scheme for implementing a TFA, such that the TFA can be stored in a compact memory, and such that the run-time overheads of TFA operations are significantly reduced, was also described.

Thus, the problem of automatons with too many states (DFA) or too many possible simultaneously active states (NFA) is solved by regrouping NFA active state combination with each associated DFA state into up to a user-selectable maximum number (b) of distinct subsets such that a number of total number of distinct subsets is minimized. The problem of regrouping NFA active state combinations to minimize the total number of distinct subsets may be solved by regrouping the NFA active states such that there is no overlap between the subsets split from the same NFA active state combination. Finally, the problem of representing NFA states efficiently, in a way permits efficient union operations, may be solved by using an independent graph representing NFA states as nodes and whether the NFA states can not be simultaneously active as edges, dividing the nodes of the graph into a small number of maximal cliques, and encoding each of the nodes using the number and size of the maximal cliques.

What is claimed is:

1. For use in a system including a non-transitory computer-readable storage medium storing a data structure for emulating, with, at most, a number b of concurrent active states, a nondeterministic finite automaton (NFA) having a finite set of states, a finite set of input symbols and a transition function covering each state and input symbol, the data structure including (1) a plurality of tunable finite automaton (TFA) states, up to b TFA states representing any NFA active state combination, each of the plurality of states having at least one associated state label covering the finite set of input symbols, and (2) a table including a plurality of entries, each of the plurality of entries (i) including up to b pointers to up to b TFA states, the union of the up to b TFA states corresponding to one of the NFA active state combination, and (ii) being indexed by an NFA active state combination corresponding to a state of a deterministic finite automaton representation of the NFA, a computer-implemented method for determining whether an arbitrary sequence of input symbols matches a set of regular expressions represented by the NFA, the computer-implemented method comprising:
  a) defining, with a computer system including at least one processor, each of up to b of the plurality of TFA states as an initial state;
  b) receiving, with the computer system, a next symbol of the arbitrary sequence of input symbols;
  c) using the next symbol to determine, with the computer system, a state label associated with each of the up to b initial TFA states;
  d) using a union of the up to b state labels to determine, with the computer system, one of the plurality of entries of the table;
  e) deactivating, with the computer system, each of the up to b initial TFA states;
  f) activating, with the computer system, a next set of up to b TFA states using pointers stored in the entry;
  g) determining, with the computer system, if the next set of up to b active TFA states includes at least one match TFA state;
  h) if it was determined that the next set of up to b active TFA states include at least one match TFA state, then indicating, with the computer system, a match corresponding the at least one match TFA state;
  i) if there are no unprocessed symbols of the arbitrary sequence of input symbols, ending the method, otherwise, if there are any unprocessed symbols,
    1) receiving, with the computer system, a next symbol of the arbitrary sequence of input symbols,
    2) using the next symbol to determine, with the computer system, a state label associated with each of the active TFA states,
    3) using a union of the up to b state labels to determine, with the computer system, a next one of the plurality of entries of the table,
    4) deactivating, with the computer system, the active TFA states,
    5) activating, with the computer system, a next set of up to b TFA states using pointers stored in the entry;
    6) determining, with the computer system, if the next set of up to b active TFA states include at least one match TFA state,
    7) if it was determined that the next set of up to b active TFA states include at least one match TFA state, then indicating, with the computer system, a match corresponding the at least one match TFA state, and
    8) if there are no unprocessed symbols of the arbitrary sequence of input symbols, ending the method, otherwise, if there are any unprocessed symbols, repeating acts (i)(1) through (i)(8) while there are any unprocessed symbols of the arbitrary sequence of input symbols,
  wherein the number b is a specified parameter and is at least 2.

2. The computer-implemented method of claim 1 wherein the acts of determining a union of the state labels are performed using a bitwise OR operation of bit vector representations of the NFA state labels.

3. The computer-implemented method of claim 1 wherein each of the NFA states are represented by a bit vector, and wherein all of the bit vectors have the same length.

4. The computer-implemented method of claim 1 wherein the number b is between 2 and 4.

5. An apparatus, for determining whether an arbitrary sequence of input symbols matches a set of regular expressions represented by a nondeterministic finite automaton (NFA), the apparatus comprising:
  a) a non-transitory computer-readable storage medium storing a data structure for emulating, with, at most, a number b of concurrent active states, an NFA having a finite set of states, a finite set of input symbols and a transition function covering each state and input symbol, the data structure including:
    1) a plurality of tunable finite automaton (TFA) states, up to b TFA states representing any NFA active state combination, each of the plurality of states having at least one associated state label covering the finite set of input symbols; and
    2) a table including a plurality of entries, each of the plurality of entries (i) including up to b pointers to up to b sets of NFA states, each of the up to b sets of NFA states corresponding to one of the plurality of TFA states, and (ii) being indexed by a set of NFA states corresponding to states of a deterministic finite automaton representation of the NFA;
  b) an input for receiving the arbitrary sequence of input symbols;
  c) at least one processor;
  d) a machine readable medium storing processor-executable instructions which, when executed by the at least one processor, perform a method of
    1) defining each of up to b of the plurality of TFA states as an initial state,
    2) receiving a next symbol of the arbitrary sequence of input symbols,
    3) using the next symbol to determine a state label associated with each of the up to b initial TFA states,
    4) using a union of the up to b state labels to determine one of the plurality of entries of the table,
    5) deactivating each of the up to b initial TFA states,
    6) activating a next set of up to b TFA states using pointers stored in the entry,
    7) determining if the next set of up to b active TFA states includes at least one match TFA state,
    8) if it was determined that the next set of up to b active TFA states include at least one match TFA state, then indicating a match corresponding the at least one match TFA state,
    9) if there are no unprocessed symbols of the arbitrary sequence of input symbols, ending the method, otherwise, if there are any unprocessed symbols,
      A) receiving a next symbol of the arbitrary sequence of input symbols,
      B) using the next symbol to determine a state label associated with each of the active TFA states,
      C) using a union of the up to b state labels to determine, with the computer system, a next one of the plurality of entries of the table,
      D) deactivating, with the computer system, the active TFA states,
      E) activating, with the computer system, a next set of up to b TFA states using pointers stored in the entry;
      F) determining, with the computer system, if the next set of up to b active TFA states include at least one match TFA state,
      G) if it was determined that the next set of up to b active TFA states include at least one match TFA state, then indicating, with the computer system, a match corresponding the at least one match TFA state, and H) if there are no unprocessed symbols of the arbitrary sequence of input symbols, ending the method, otherwise, if there are any unprocessed symbols, repeating acts (9)(A) through (9)(H) while there are any unprocessed symbols of the arbitrary sequence of input symbols, wherein the number b is a specified parameter and is at least 2.

6. The apparatus of claim 5 wherein the acts of determining a union of the state labels are performed using a bitwise OR operation of bit vector representations of the NFA state labels.

7. The apparatus of claim 5 wherein each of the NFA states are represented by a bit vector, and wherein all of the bit vectors have the same length.

8. The apparatus of claim 5 wherein the number b is between 2 and 4.

9. A non-transitory computer-readable storage medium storing a data structure for emulating, with, at most, a number b of concurrent active states, a nondeterministic finite automaton (NFA) having a finite set of states, a finite set of input symbols and a transition function covering each state and input symbol, the data structure including:
   a) a plurality of tunable finite automaton (TFA) states, up to b TFA states representing any NFA active state combination, each of the plurality of states having at least one associated state label covering the finite set of input symbols; and
   b) a table including a plurality of entries, each of the plurality of entries (i) including up to b pointers to up to b sets of NFA states, each of the up to b sets of NFA states corresponding to one of the plurality of TFA states, and (ii) being indexed by a set of NFA states corresponding to states of a deterministic finite automaton representation of the NFA; and
   c) a machine readable medium storing processor-executable instructions which, when executed by at least one processor, perform a method of
      1) defining each of up to b of the plurality of TFA states as an initial state,
      2) receiving a next symbol of the arbitrary sequence of input symbols,
      3) using the next symbol to determine a state label associated with each of the up to b initial TFA states,
      4) using a union of the up to b state labels to determine one of the plurality of entries of the table,
      5) deactivating each of the up to b initial TFA states,
      6) activating a next set of up to b TFA states using pointers stored in the entry,
      7) determining if the next set of up to b active TFA states includes at least one match TFA state,
      8) if it was determined that the next set of up to b active TFA states include at least one match TFA state, then indicating a match corresponding the at least one match TFA state,
      9) if there are no unprocessed symbols of the arbitrary sequence of input symbols, ending the method, otherwise, if there are any unprocessed symbols,
         A) receiving a next symbol of the arbitrary sequence of input symbols,
         B) using the next symbol to determine a state label associated with each of the active TFA states,
         C) using a union of the up to b state labels to determine, with the computer system, a next one of the plurality of entries of the table,
         D) deactivating, with the computer system, the active TFA states,
         E) activating, with the computer system, a next set of up to b TFA states using pointers stored in the entry;
         F) determining, with the computer system, if the next set of up to b active TFA states include at least one match TFA state,
         G) if it was determined that the next set of up to b active TFA states include at least one match TFA state, then indicating, with the computer system, a match corresponding the at least one match TFA state, and
         H) if there are no unprocessed symbols of the arbitrary sequence of input symbols, ending the method, otherwise, if there are any unprocessed symbols, repeating acts (9)(A) through (9)(H) while there are any unprocessed symbols of the arbitrary sequence of input symbols, wherein the number b is a specified parameter and is at least 2.

10. The non-transitory storage medium of claim 9 wherein the acts of determining a union of the state labels are performed using a bitwise OR operation of bit vector representations of the NFA state labels.

11. The non-transitory storage medium of claim 9 wherein each of the NFA states are represented by a bit vector, and wherein all of the bit vectors have the same length.

12. The non-transitory computer-readable storage medium of claim 9 wherein the number b is between 2 and 4.

* * * * *